(12) United States Patent
Caridis et al.

(10) Patent No.: US 12,441,020 B2
(45) Date of Patent: Oct. 14, 2025

(54) APPARATUS AND METHOD FOR CUTTING ELONGATE PRODUCTS UTILIZING CONVEYOR SYSTEM

(71) Applicant: Heat and Control, Inc., Hayward, CA (US)

(72) Inventors: Andrew Anthony Caridis, San Carlos, CA (US); David Ramirez Resendiz, Guadalajara (MX); Sergio Gonzalez Granados, Las Liebres (MX)

(73) Assignee: Heat and Control, Inc., Hayward, CA (US)

( * ) Notice: Subject to any disclaimer, the term of this patent is extended or adjusted under 35 U.S.C. 154(b) by 145 days.

(21) Appl. No.: 18/242,481

(22) Filed: Sep. 5, 2023

(65) Prior Publication Data

US 2025/0073941 A1    Mar. 6, 2025

Related U.S. Application Data

(63) Continuation-in-part of application No. PCT/IB2022/051959, filed on Mar. 5, 2022.

(30) Foreign Application Priority Data

Mar. 5, 2021 (MX) .................... MX/a/2021/002651

(51) Int. Cl.
*B26D 7/06* (2006.01)
*B08B 3/04* (2006.01)
*B26D 7/01* (2006.01)

(52) U.S. Cl.
CPC ............ *B26D 7/0625* (2013.01); *B08B 3/041* (2013.01); *B26D 7/01* (2013.01); *B26D 2007/013* (2013.01); *B26D 2210/02* (2013.01)

(58) Field of Classification Search
CPC .................................................. B26D 7/0625
See application file for complete search history.

(56) References Cited

U.S. PATENT DOCUMENTS 2,378,502 A     6/1945  Richardson
2,966,254 A  *  12/1960  Kaiser .................... B65G 37/00
                                                      198/801

(Continued)

FOREIGN PATENT DOCUMENTS

| CN | 107351141 A | 11/2017 |
| EP | 1704971 A1 | 9/2006 |
| KR | 10-2010-0116437 A | 11/2010 |

OTHER PUBLICATIONS

Office Action dated Dec. 10, 2024 for Mexican Application No. MX/a/2021/002651, filed Mar. 5, 2021 (with English-language translation).

(Continued)

*Primary Examiner* — Sean M Michalski
(74) *Attorney, Agent, or Firm* — Law Offices of Donald N. MacIntosh

(57) ABSTRACT

A method for cutting an elongated food product that includes providing a first conveyor belt portion and a second conveyor belt portion for forming opposed first and second sides of a passageway. A third conveyor belt portion can be disposed adjacent the first conveyor belt portion and the second conveyor belt portion for forming a third side of the passageway. The elongated food product can be delivered to an entrance of the passageway and transported through the passageway to an outlet of the passageway. The elongated food product from the outlet can be cut to provide cut food product. An apparatus of cutting an elongated food product is provided.

17 Claims, 18 Drawing Sheets

(56) References Cited

U.S. PATENT DOCUMENTS

| | | | | |
|---|---|---|---|---|
| 3,603,449 | A * | 9/1971 | Snow, III | B65G 29/02 |
| | | | | 198/826 |
| 4,008,508 | A * | 2/1977 | LaPine | A22C 29/026 |
| | | | | 452/173 |
| 4,166,525 | A * | 9/1979 | Bruno | B65G 47/71 |
| | | | | 198/572 |
| 4,380,286 | A * | 4/1983 | Seragnoli | A24C 5/35 |
| | | | | 198/607 |
| 4,852,441 | A | 8/1989 | Anders et al. | |
| 5,038,647 | A * | 8/1991 | Biagiotti | B26D 1/54 |
| | | | | 83/458 |
| 5,449,166 | A * | 9/1995 | Lohmann | B07C 1/18 |
| | | | | 271/902 |
| 5,875,697 | A * | 3/1999 | Cole | B65G 15/14 |
| | | | | 198/841 |
| 6,413,566 | B2 | 7/2002 | Caridis et al. | |
| 6,644,154 | B2 * | 11/2003 | Wierschke | B26D 1/16 |
| | | | | 83/327 |
| 6,782,889 | B2 * | 8/2004 | Ducci | A24C 5/1842 |
| | | | | 131/84.1 |
| 8,439,185 | B2 * | 5/2013 | Fitzsimmons | F04B 19/24 |
| | | | | 198/626.1 |
| 8,683,903 | B2 * | 4/2014 | Strong | B26D 7/0625 |
| | | | | 198/626.4 |
| 9,016,176 | B2 * | 4/2015 | Nobukuni | B26D 7/015 |
| | | | | 83/485 |
| 2001/0022285 | A1 * | 9/2001 | Gambini | B26D 1/18 |
| | | | | 209/540 |
| 2005/0279228 | A1 * | 12/2005 | Julian | B26D 7/0641 |
| | | | | 99/537 |
| 2012/0261235 | A1 * | 10/2012 | Farina | H01M 10/54 |
| | | | | 198/605 |
| 2013/0305891 | A1 * | 11/2013 | Nobukuni | B26D 7/025 |
| | | | | 83/13 |
| 2017/0143026 | A1 * | 5/2017 | Kodali | B65G 15/16 |
| 2021/0179304 | A1 * | 6/2021 | Lovedale | B65B 25/065 |
| 2022/0355503 | A1 * | 11/2022 | Hege | B26D 7/18 |

OTHER PUBLICATIONS

Response dated Feb. 13, 2025 to Office Action dated Dec. 10, 2024 for Mexican Application No. MX/a/2021/002651, filed Mar. 5, 2021 (with English-language translation).
Response dated May 23, 2024 to Office Action dated Jan. 23, 2024 for Canadian Application No. 3173077, filed Mar. 5, 2022, pp. 1-11.
Office Action dated Sep. 12, 2024 for Canadian Application No. 3173077, filed Mar. 5, 2022, pp. 1-3.
Response dated Nov. 21, 2024 to Office Action dated Sep. 12, 2024 for Canadian Application No. 3173077, filed Mar. 5, 2022, pp. 1-7.
International Search Report dated Jun. 14, 2022 for Application No. PCT/IB2022/051959, filed Mar. 5, 2022, pp. 1-4.
Office Action dated Jan. 23, 2024 for Canadian Application No. 3173077, filed Mar. 5, 2022, pp. 1-3.
Written Opinion dated Jun. 14, 2022 for Application No. PCT/IB2022/051959, filed Mar. 5, 2022, pp. 1-6.

* cited by examiner

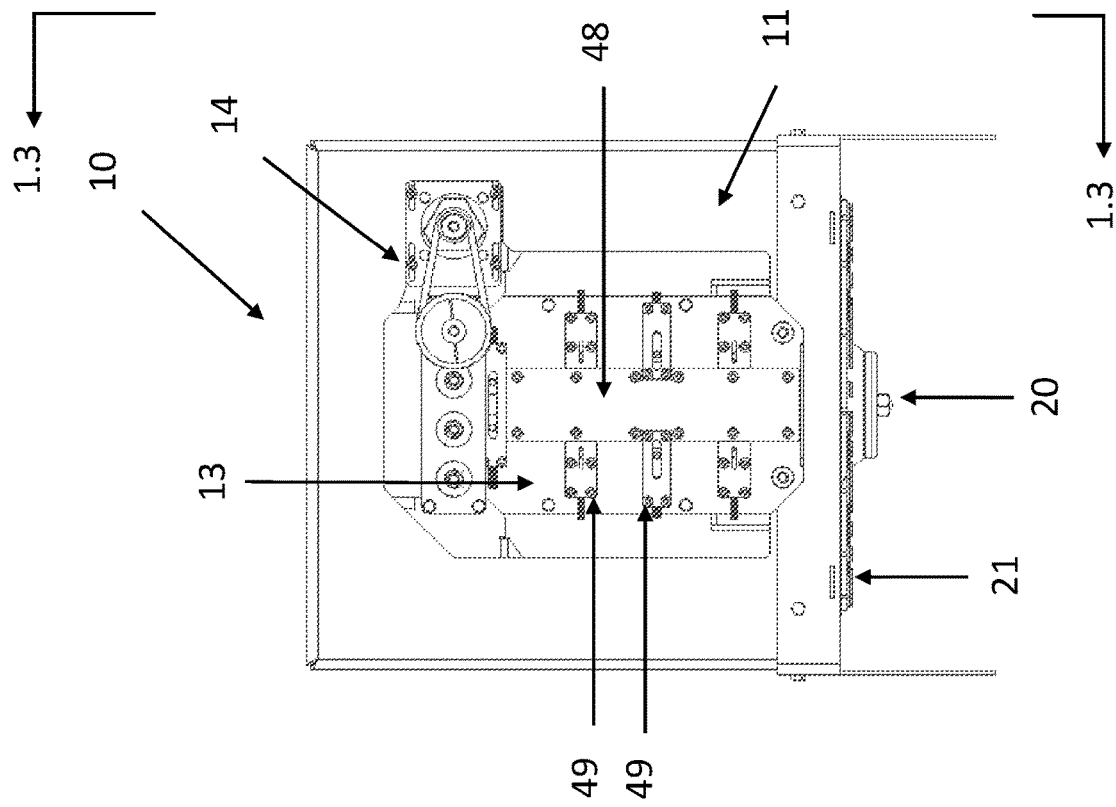
Fig. 1.2
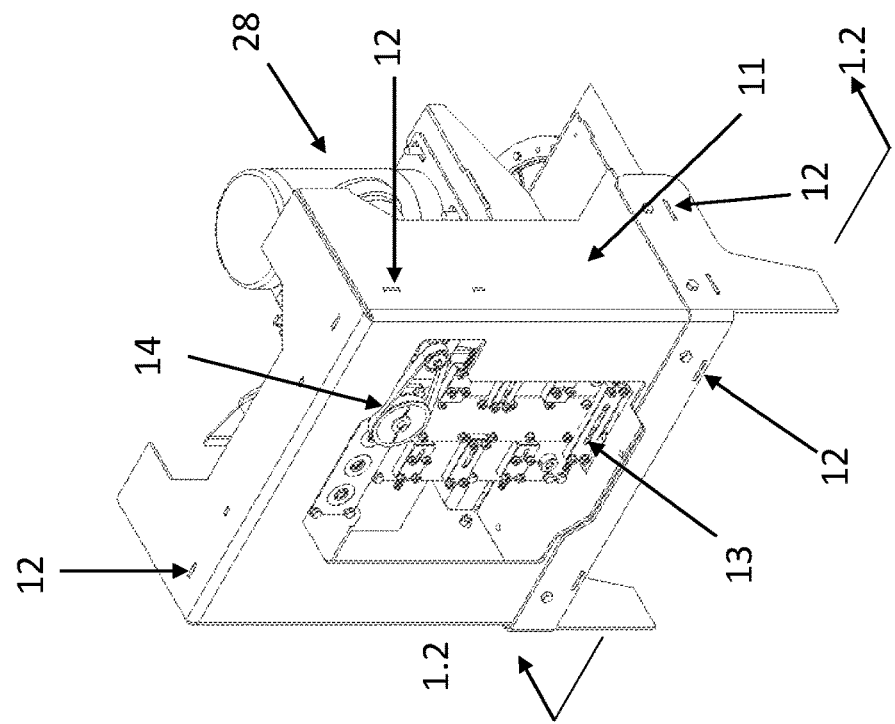
Fig. 1.1

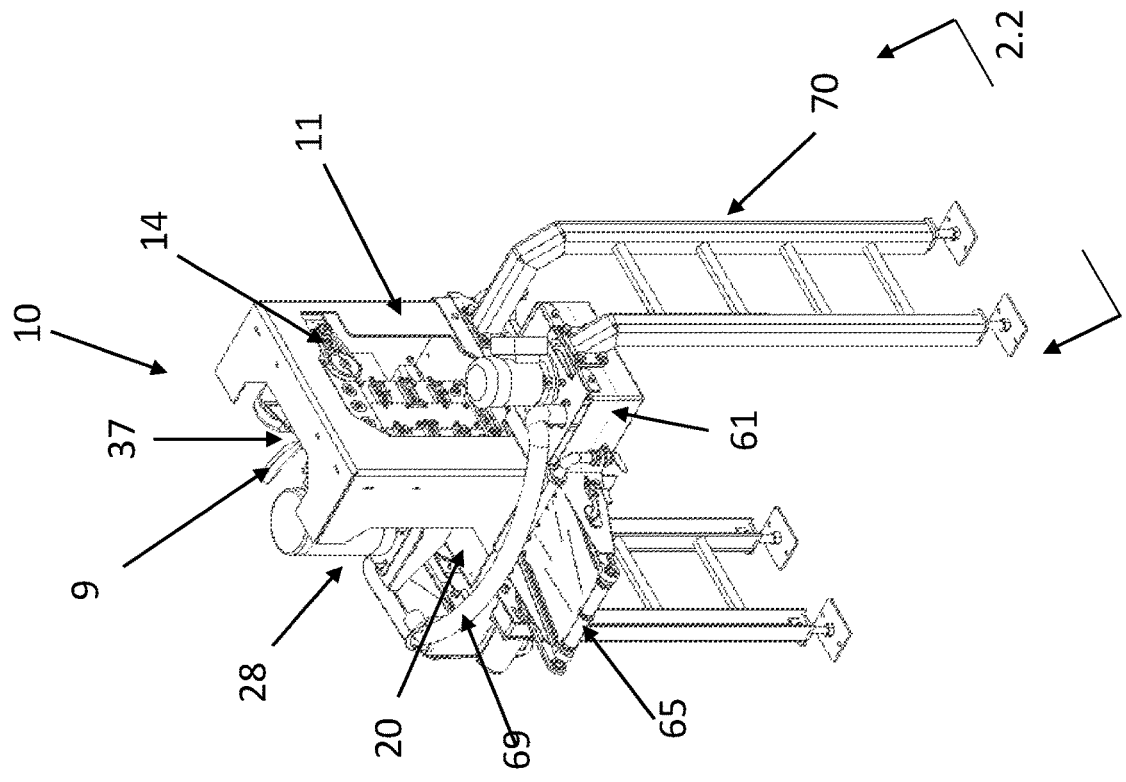
Fig. 2.1
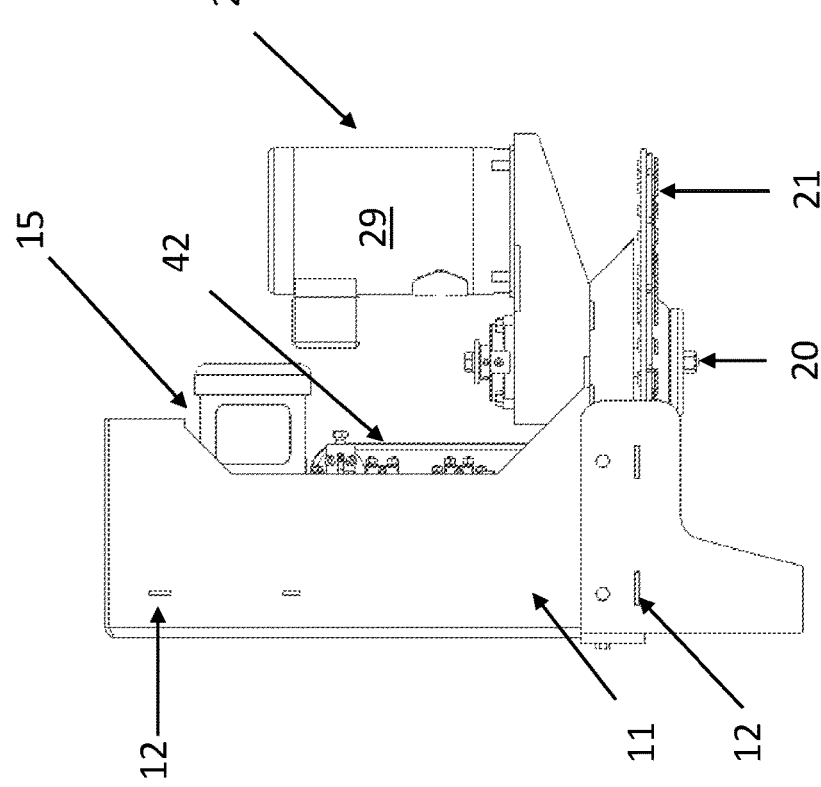
Fig. 1.3

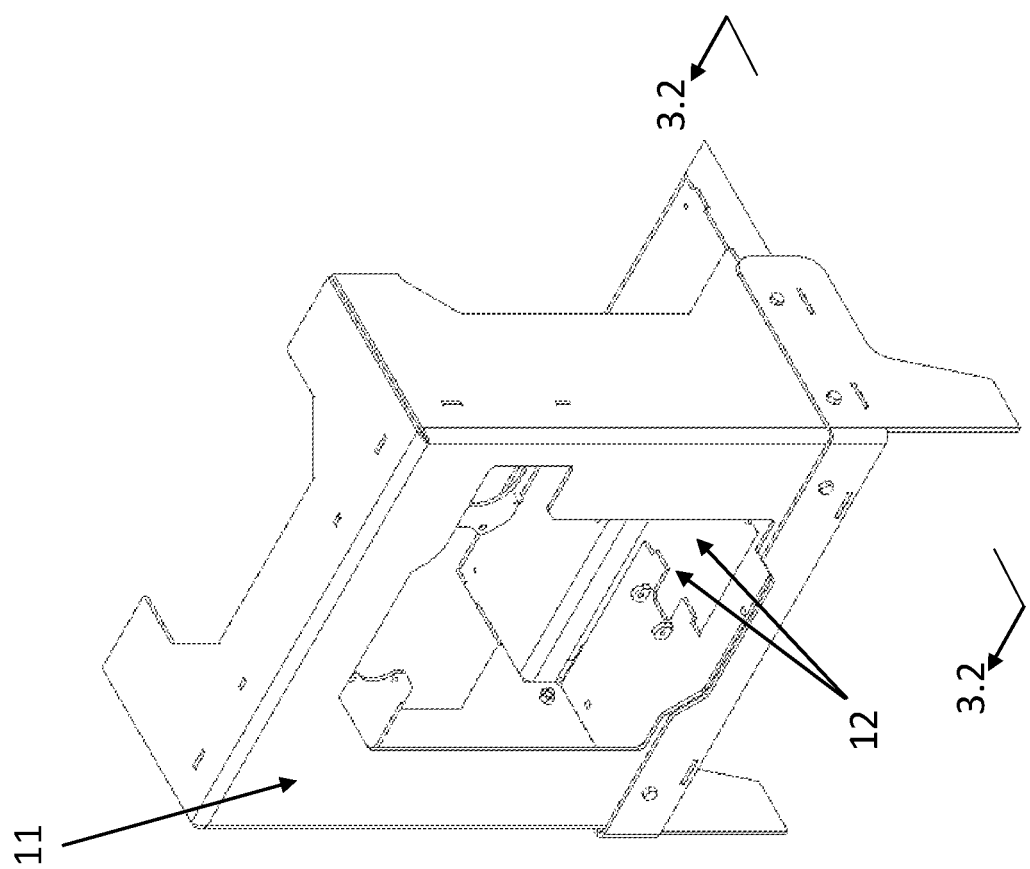
Fig. 3.1
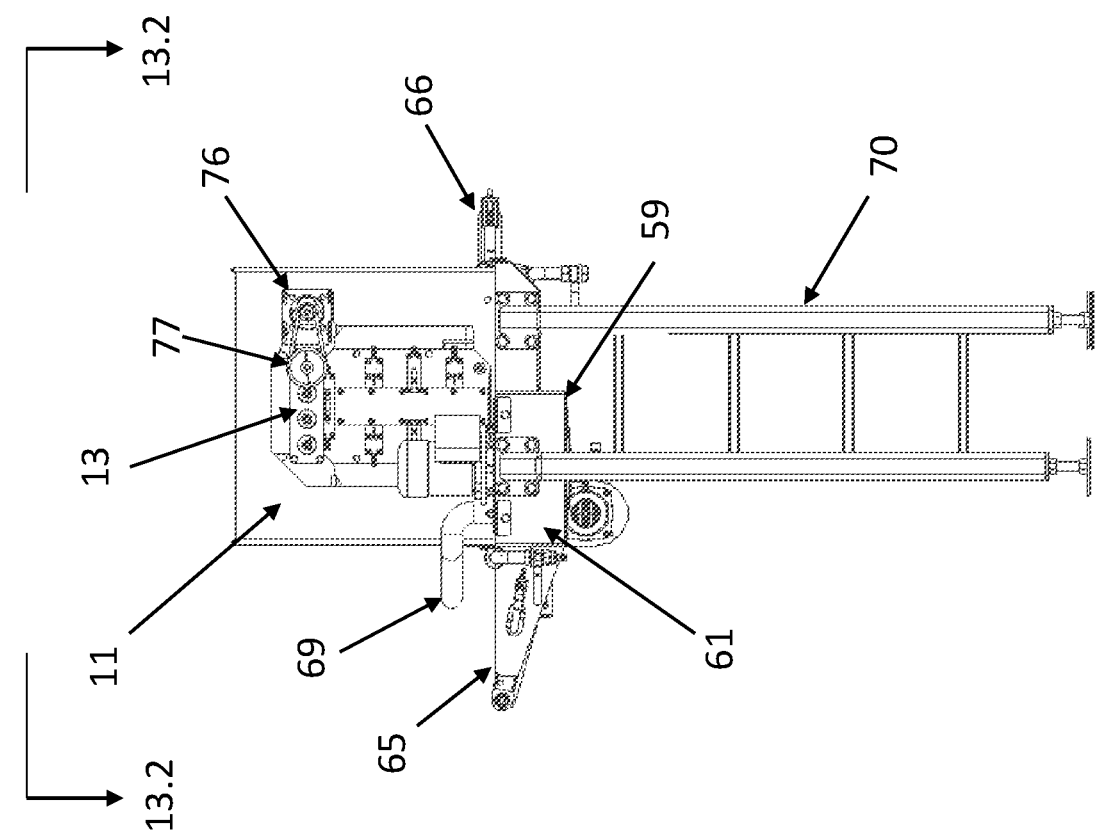
Fig. 2.2

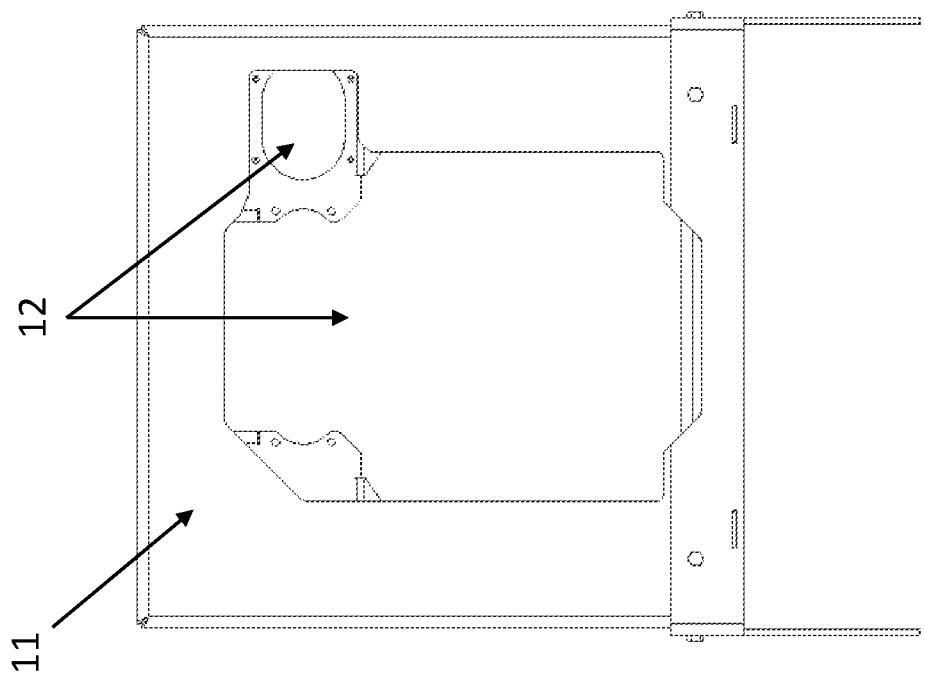
Fig. 3.3
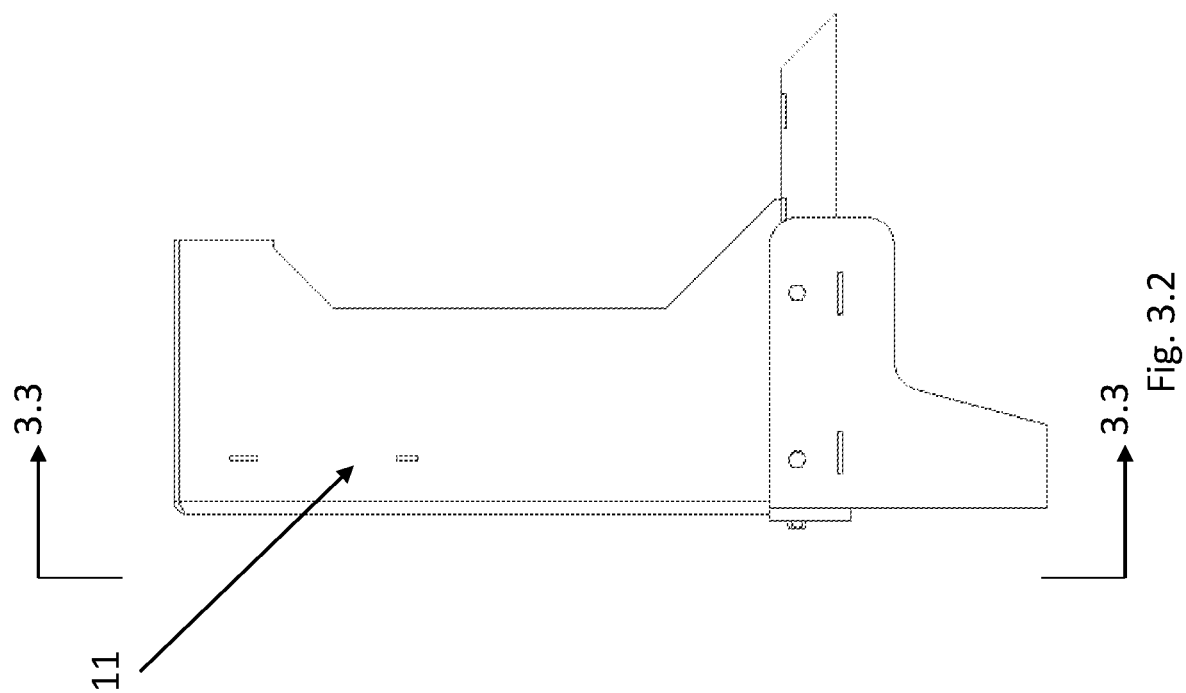
Fig. 3.2

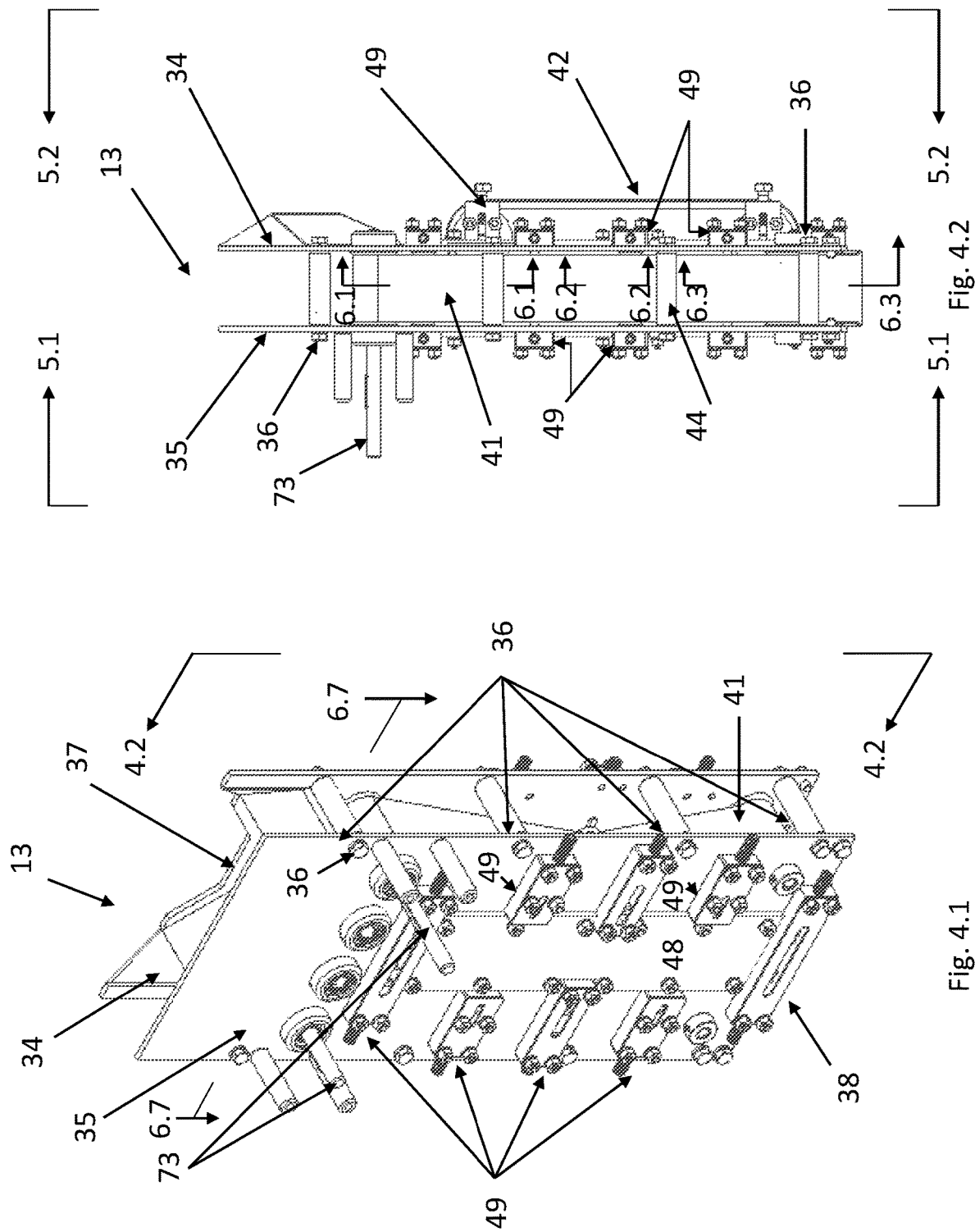

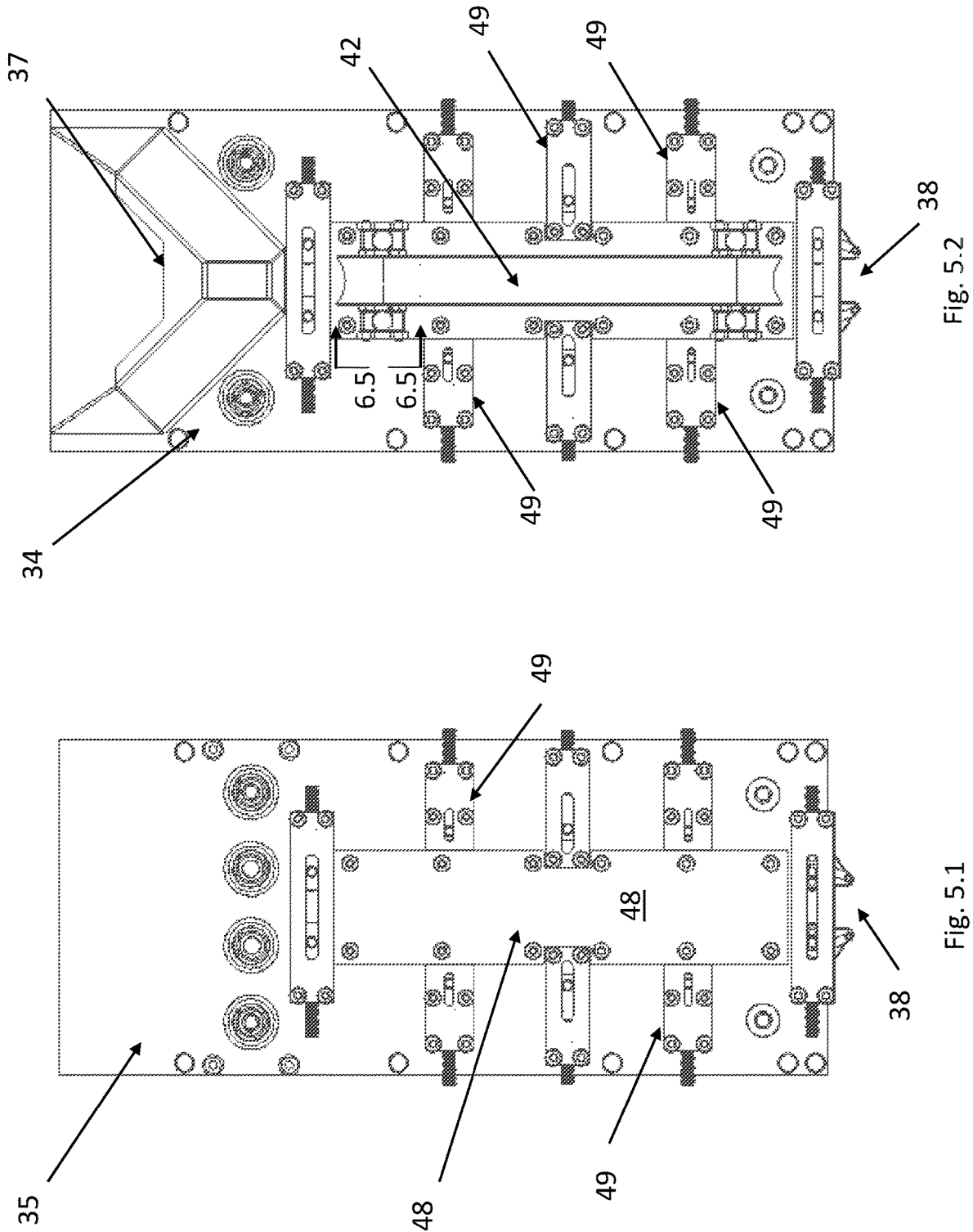

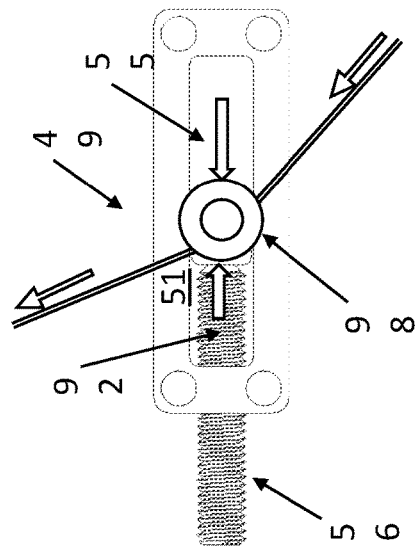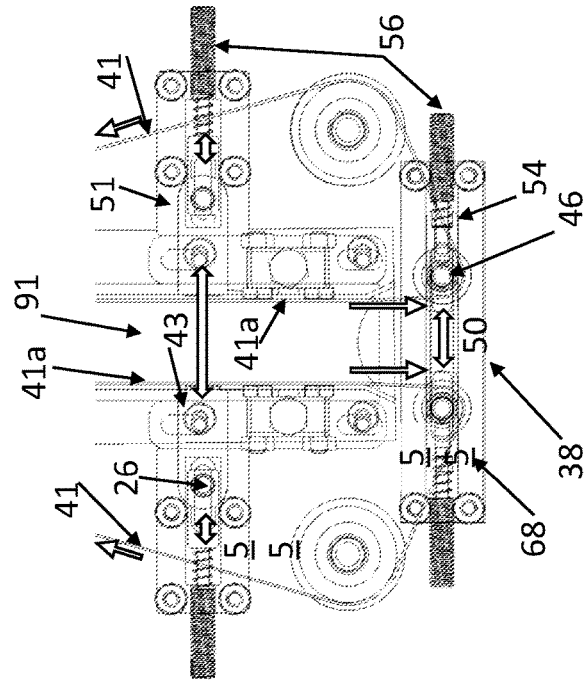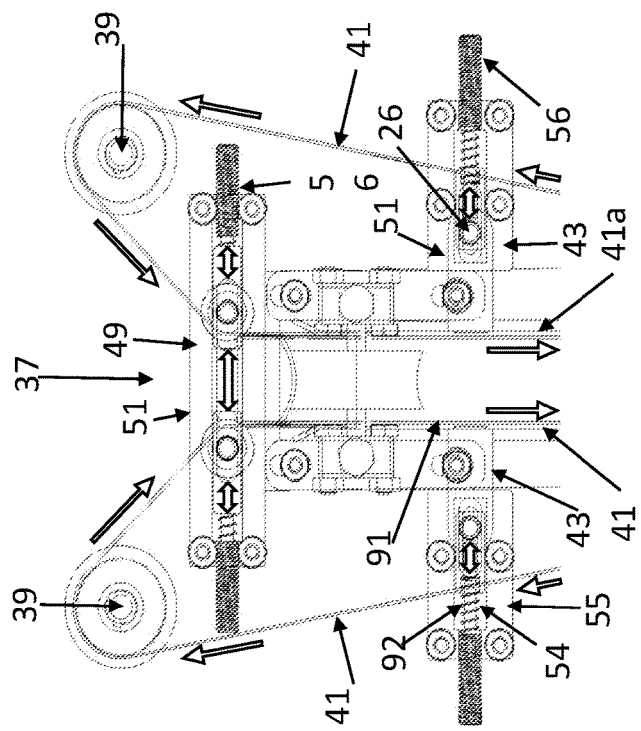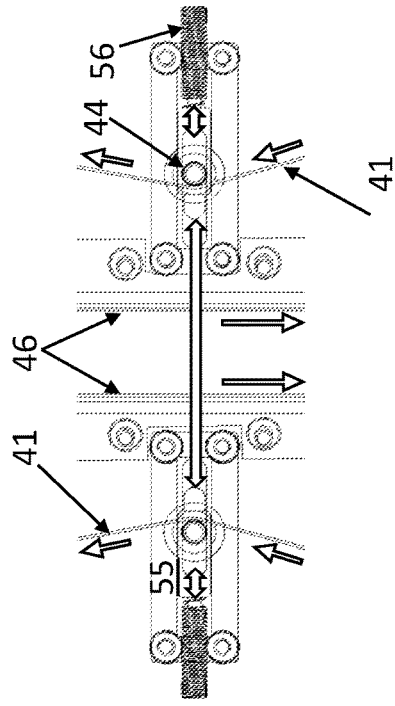

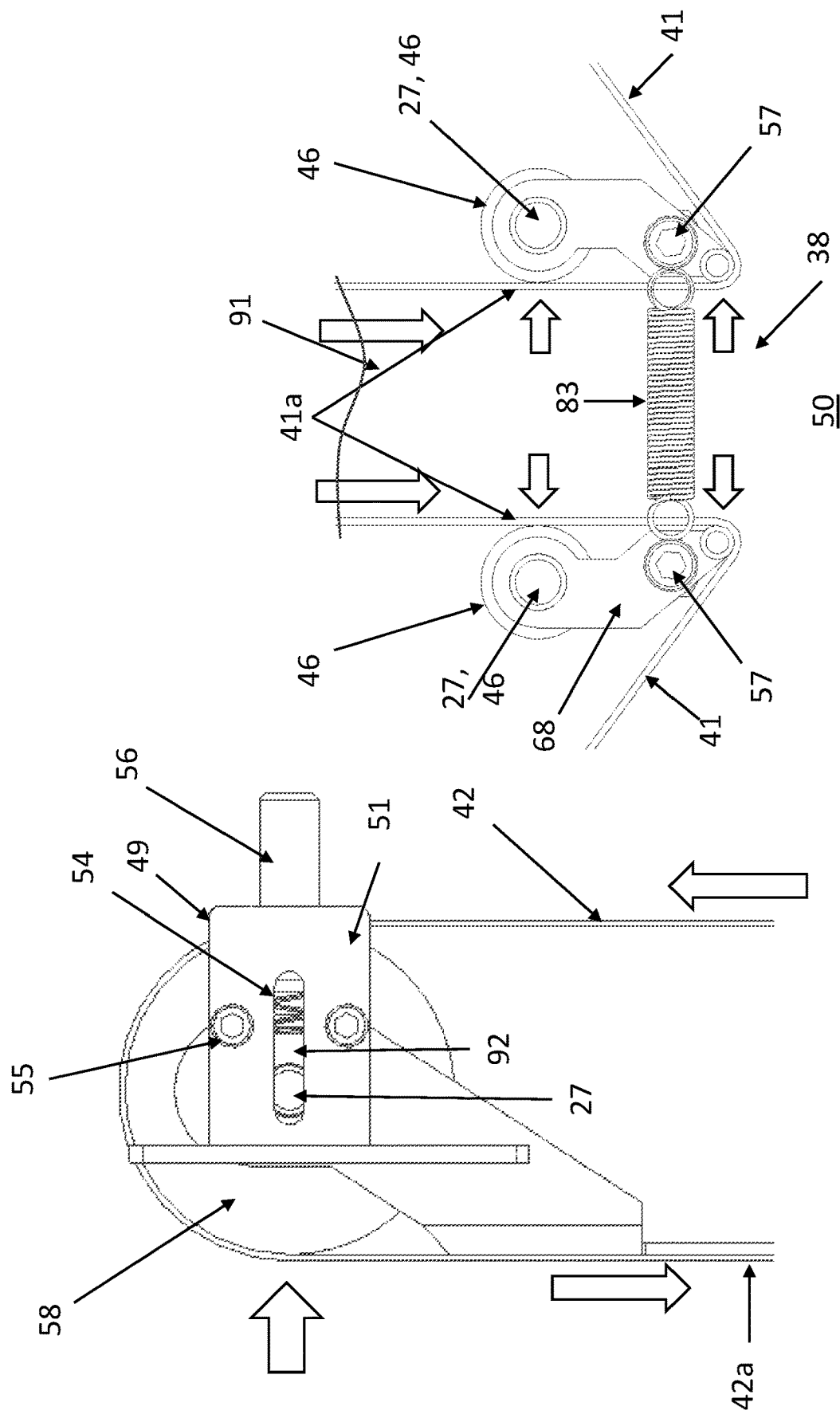

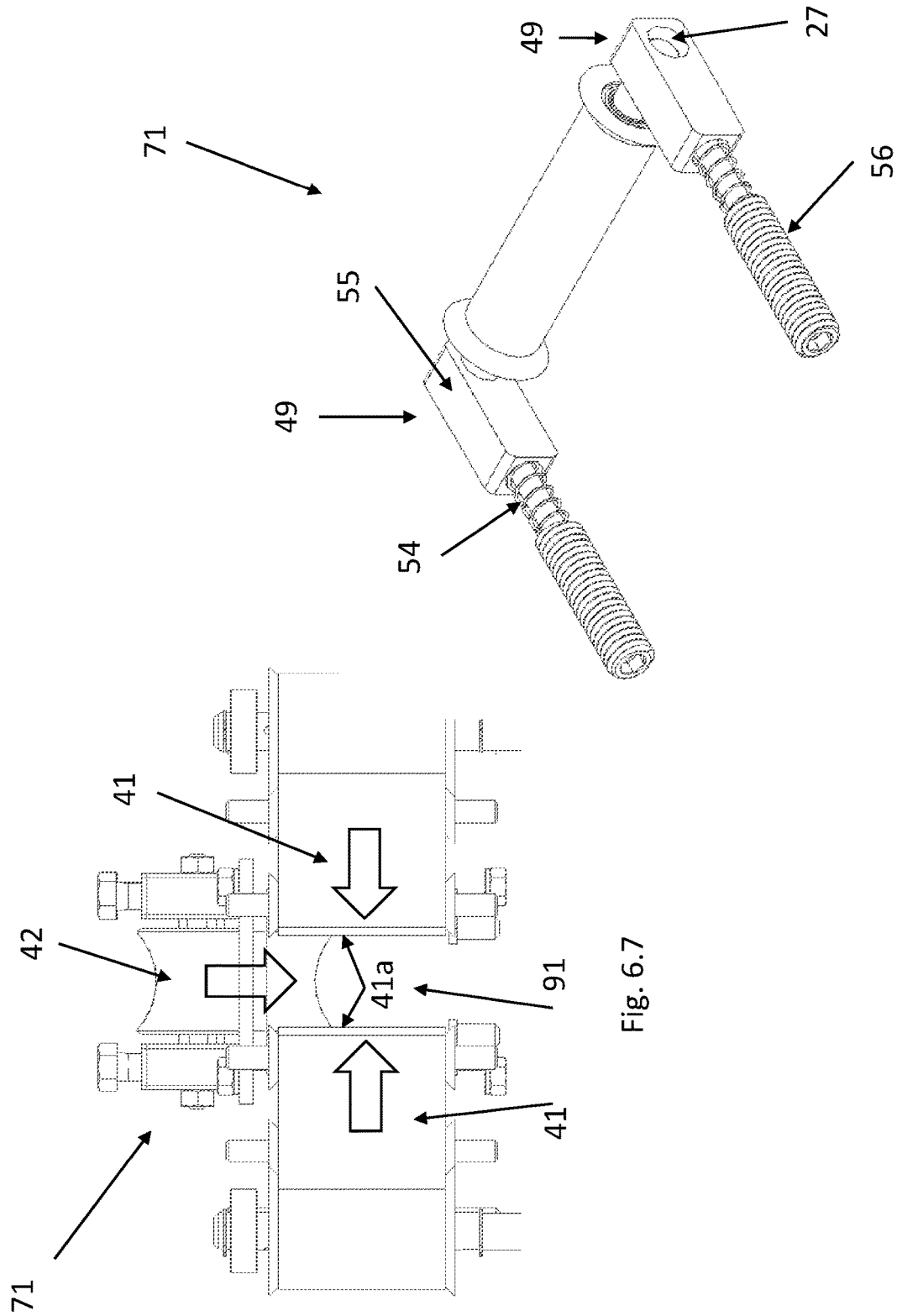

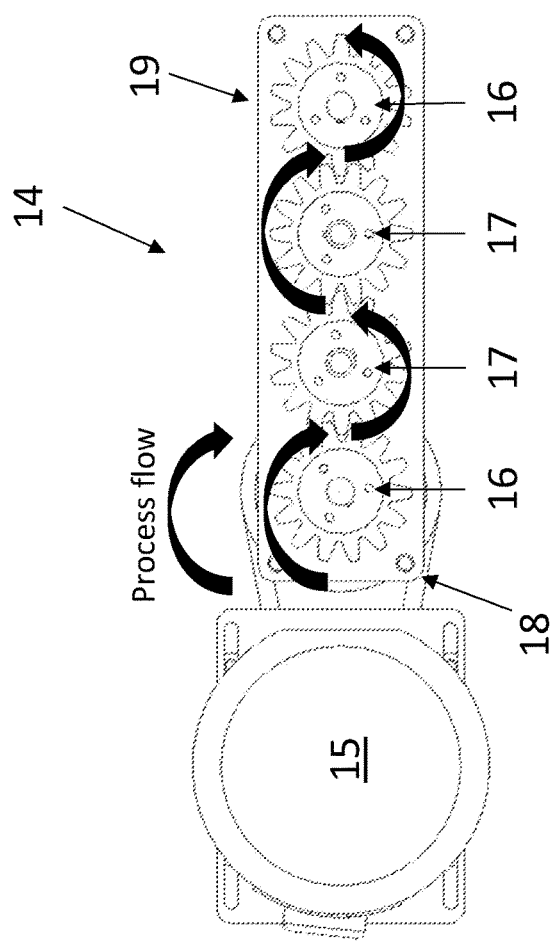
Fig. 7.1
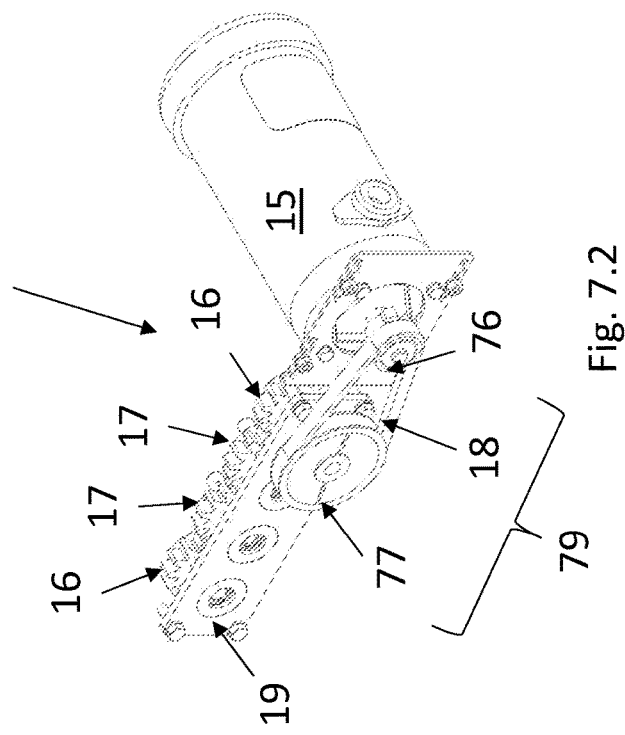
Fig. 7.2

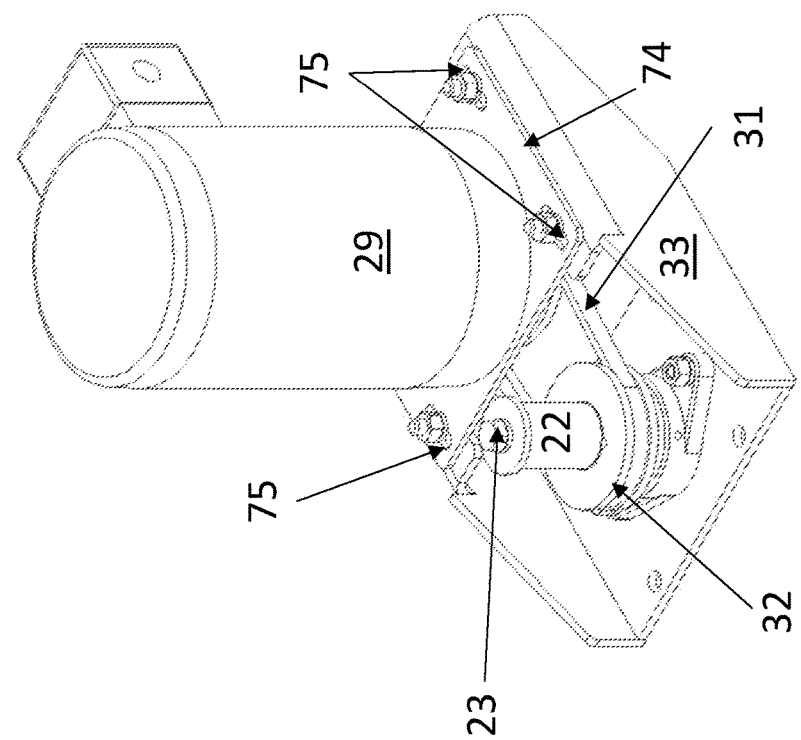
Fig. 8.2
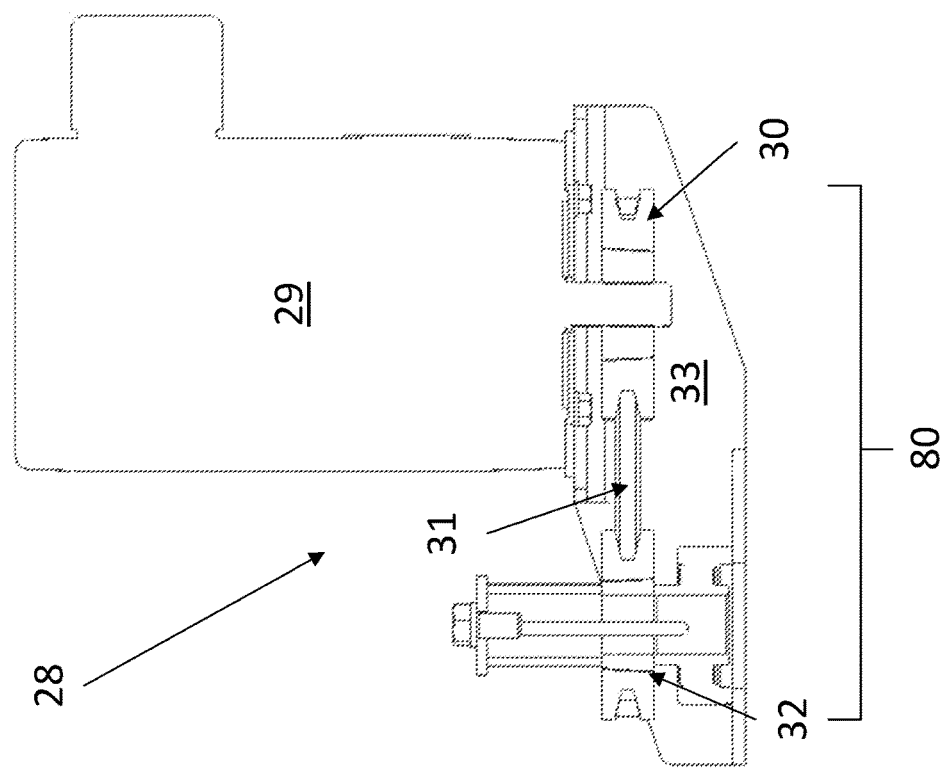
Fig. 8.1

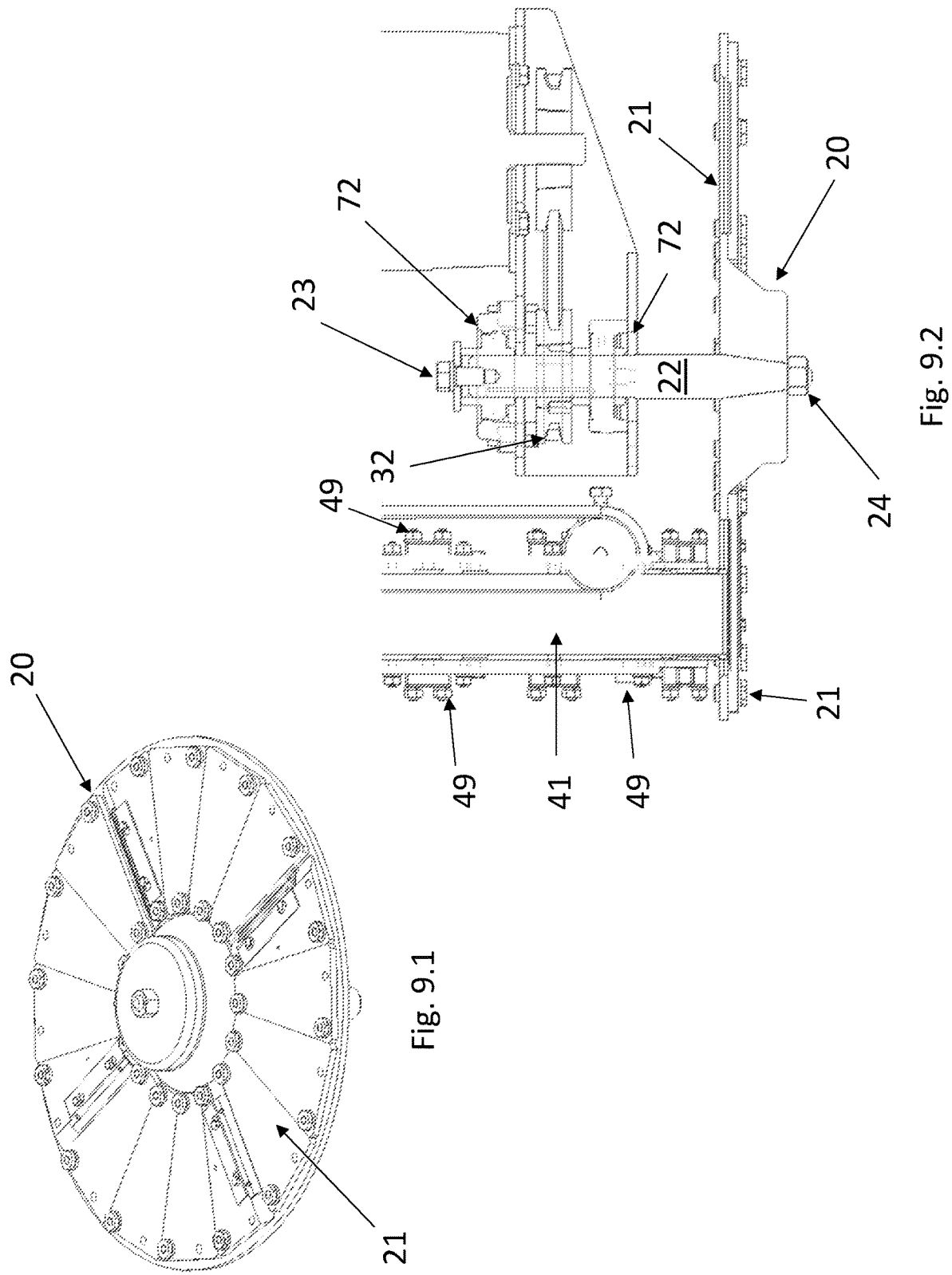
Fig. 9.1
Fig. 9.2

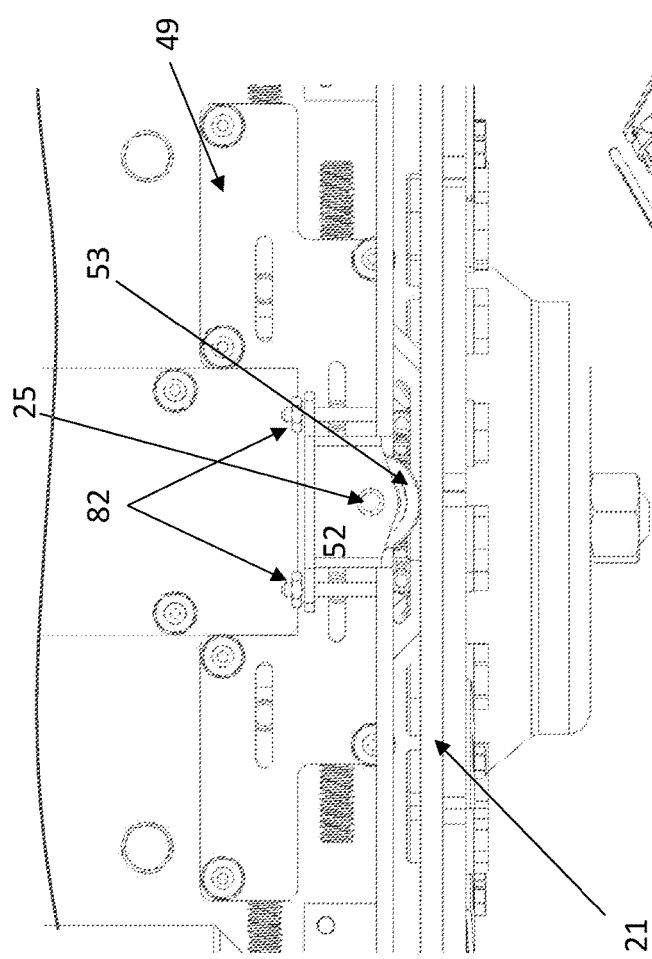
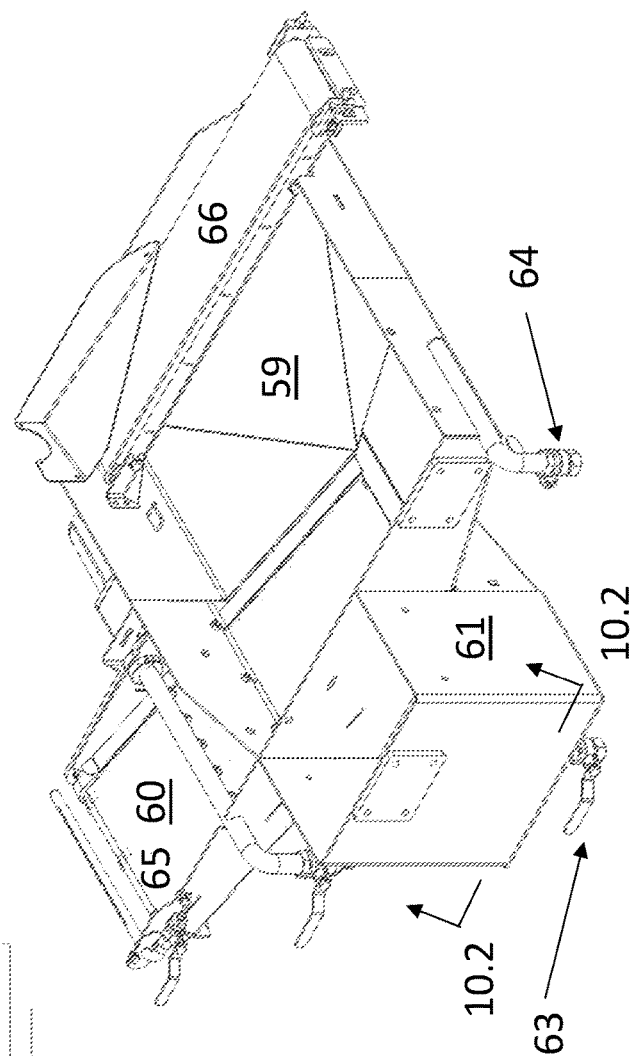
Fig 9.3
Fig. 10.1

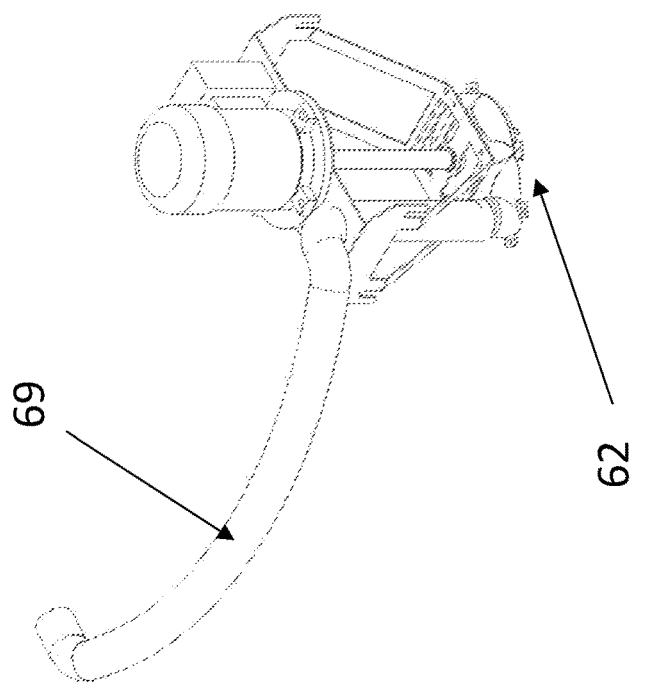
Fig. 10.3
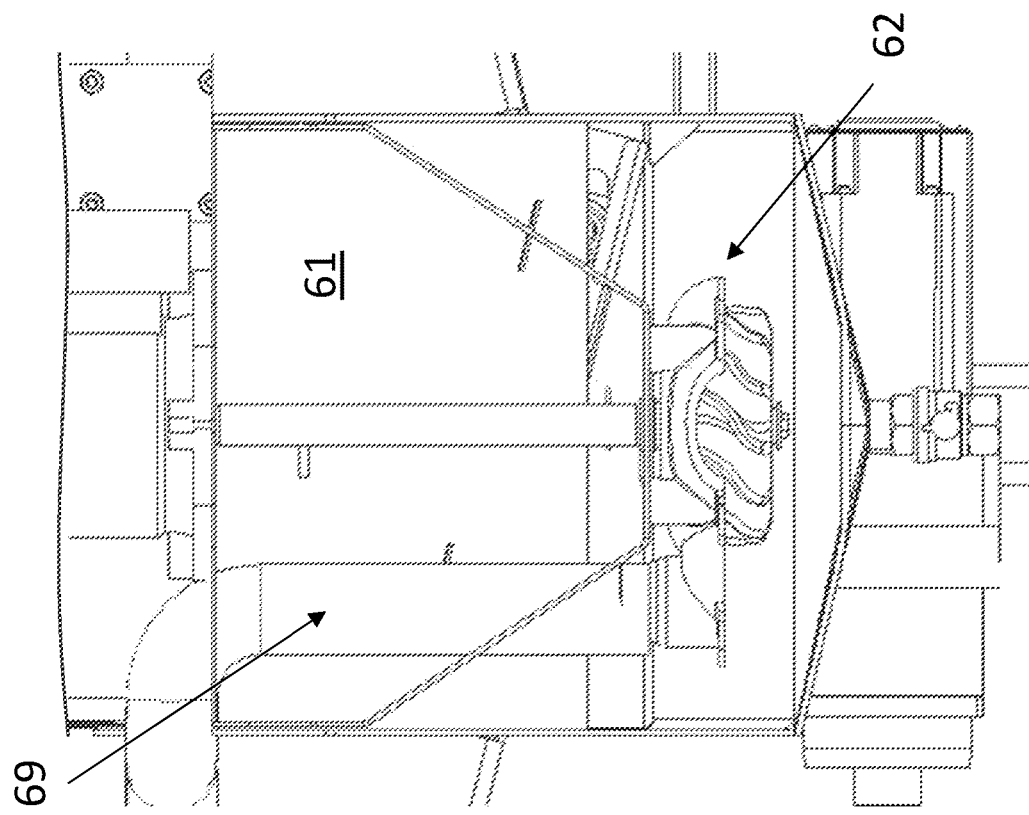
Fig. 10.2

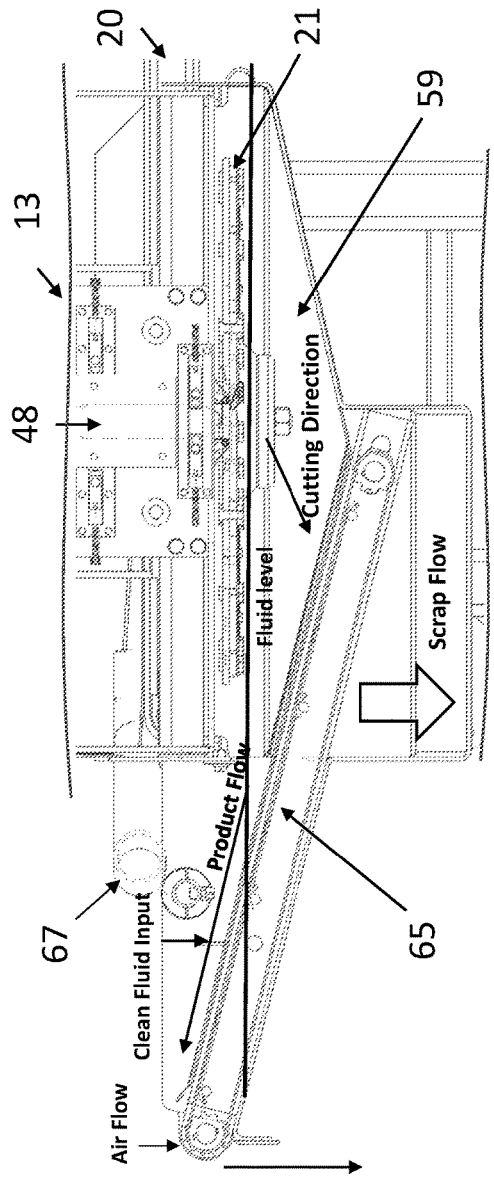
Fig. 11.1
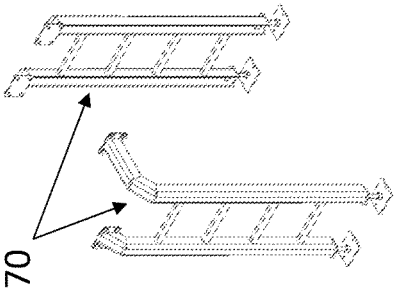
Fig. 11.3
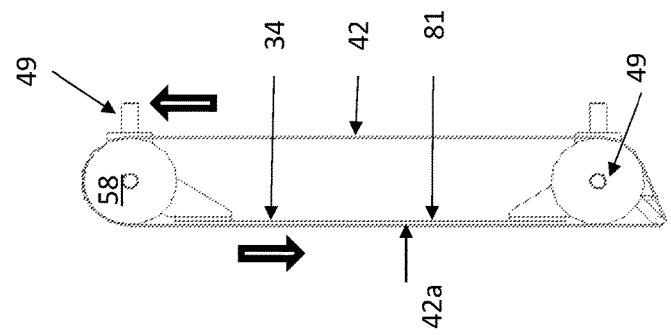
Fig. 11.2

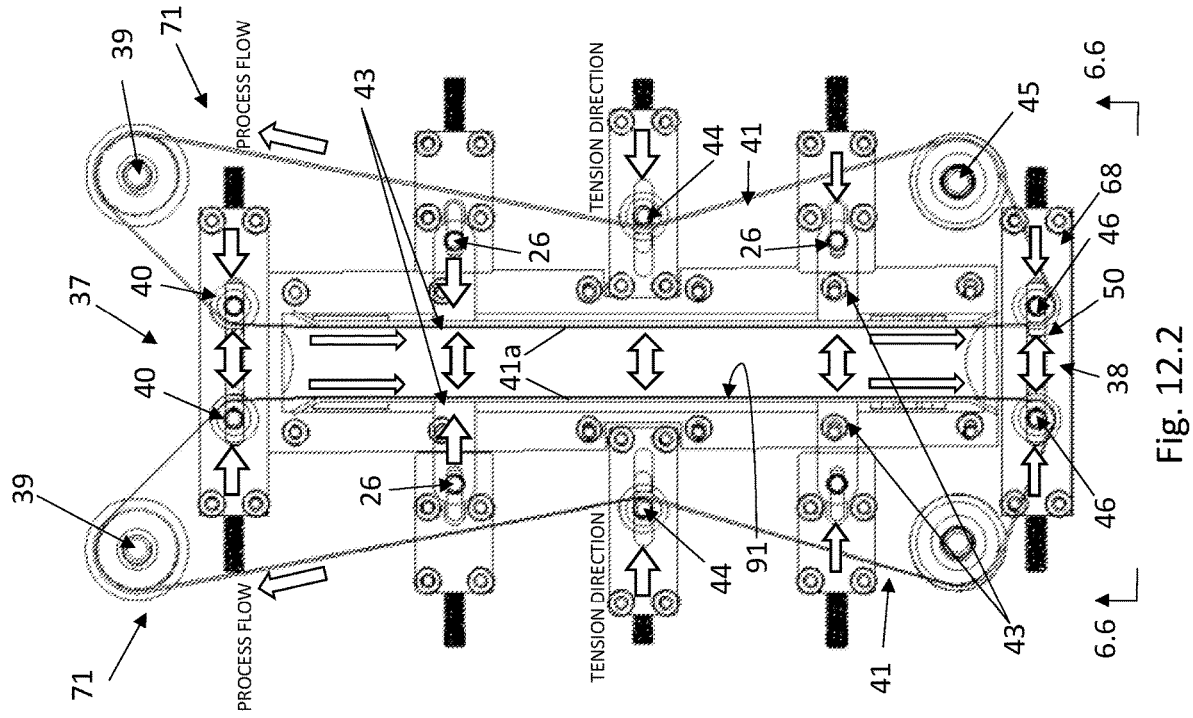
Fig. 12.2
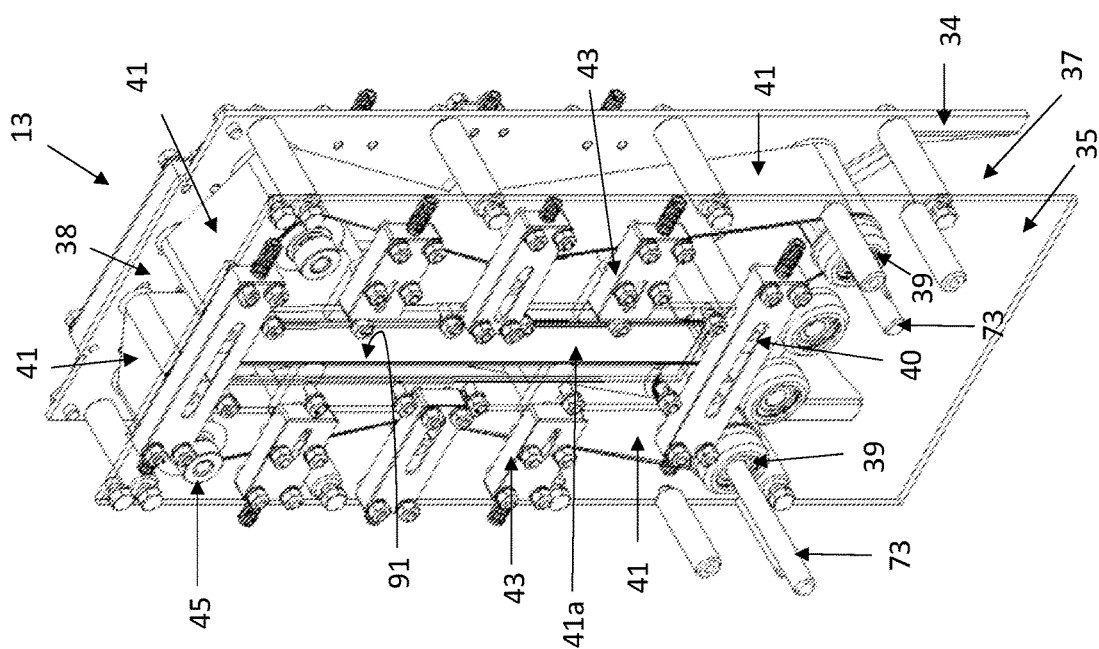
Fig. 12.1

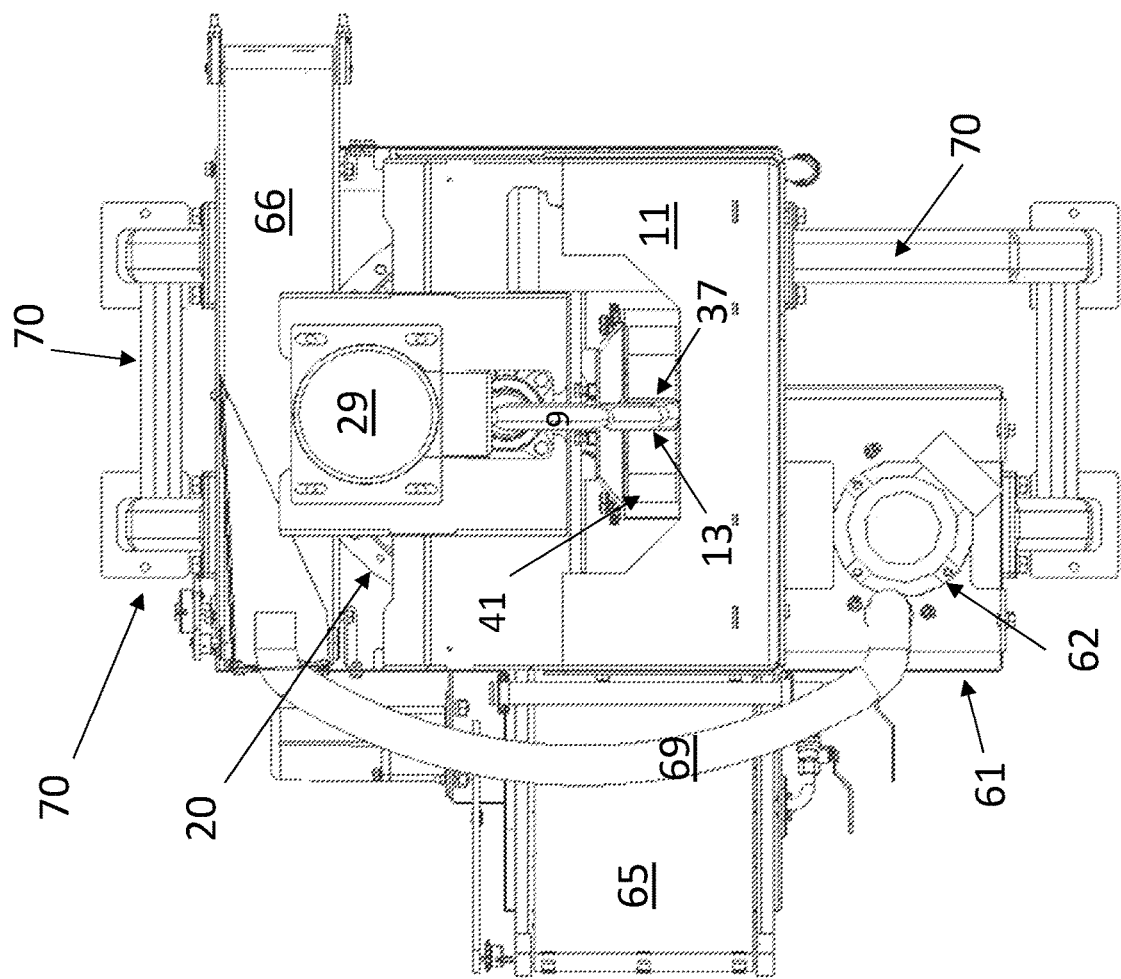
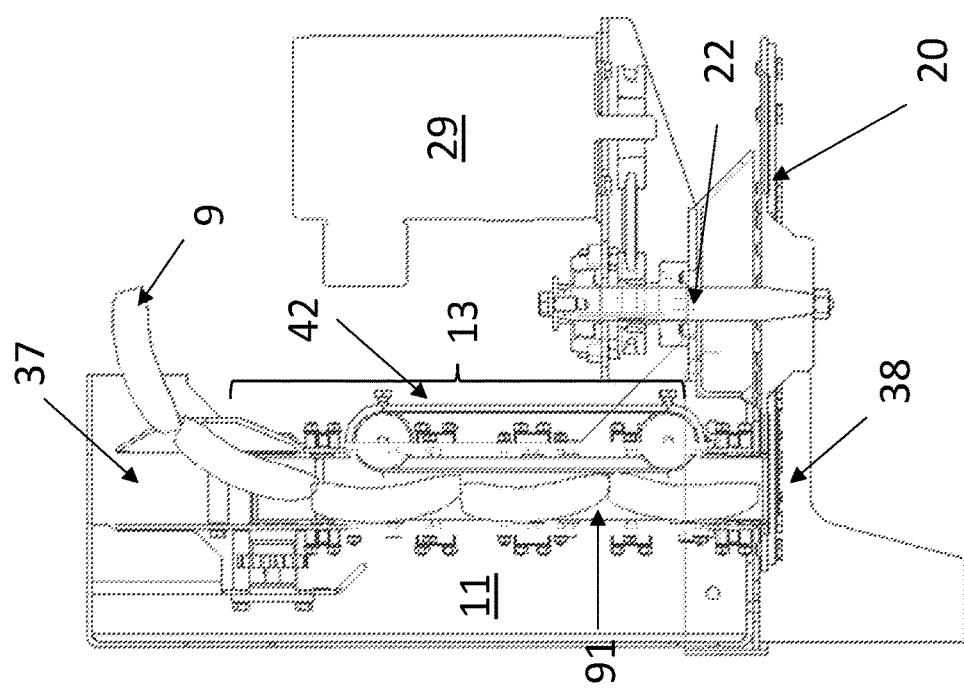
Fig. 13.2
Fig. 13.1

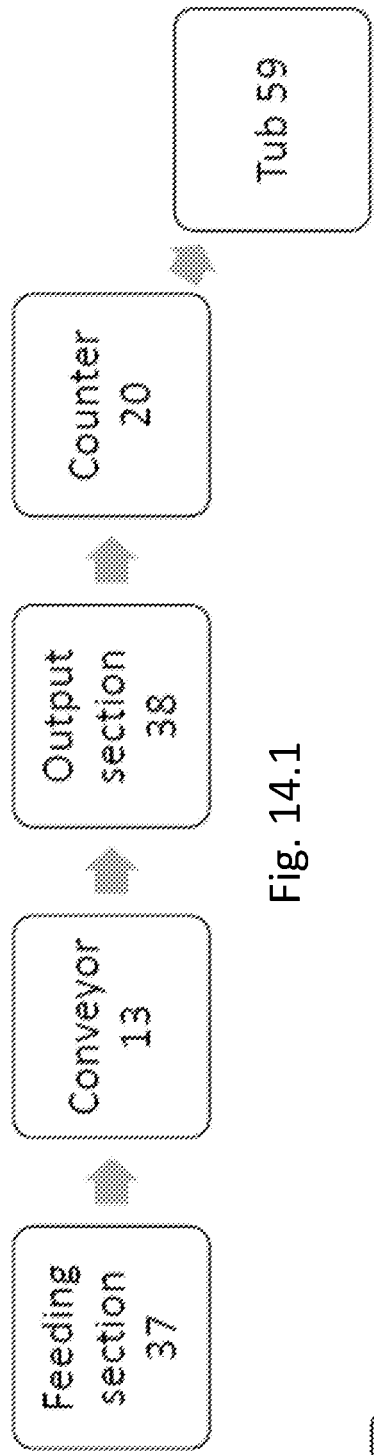
Fig. 14.1
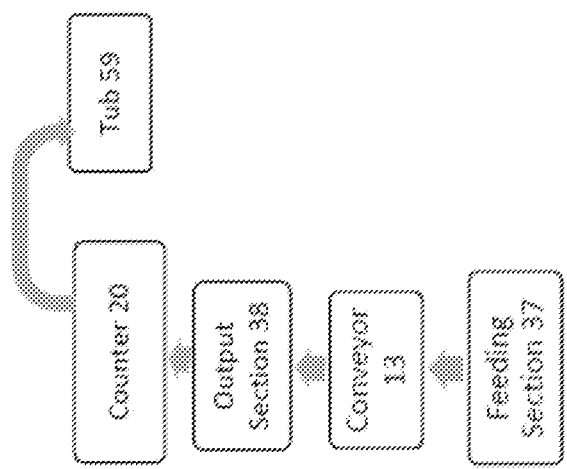
Fig. 14.3
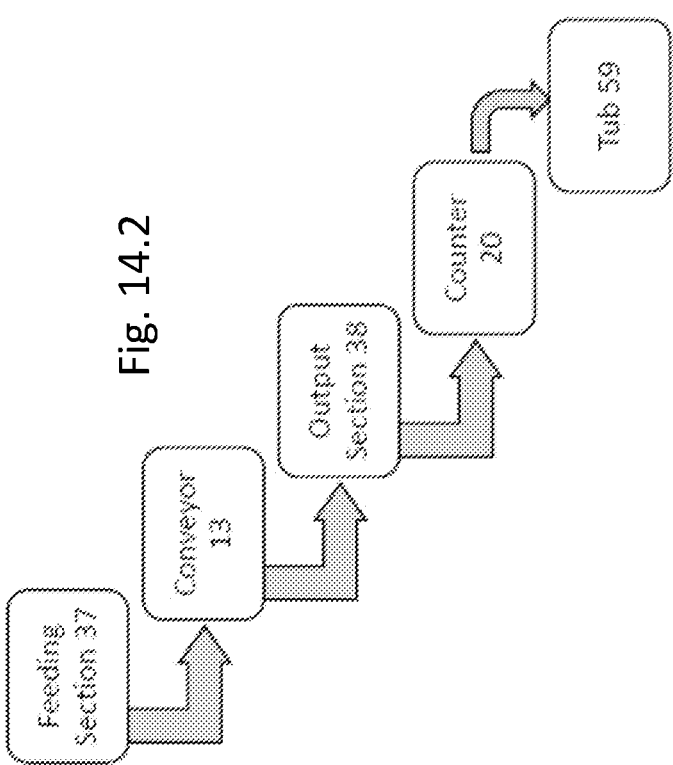
Fig. 14.2

APPARATUS AND METHOD FOR CUTTING ELONGATE PRODUCTS UTILIZING CONVEYOR SYSTEM

CROSS REFERENCE TO RELATED APPLICATION

This application claims priority to International Application Number PCT/IB2022/051959 filed Mar. 5, 2022, which claims priority to MX/a/2021/002651 filed Mar. 5, 2021, the entire contents of each of which are incorporated herein by this reference.

FIELD OF THE INVENTION

The present invention generally relates to cutting food products, and particularly to cutting food products with a generally elongated shape.

BACKGROUND OF THE INVENTION

Apparatus and methods for cutting products, particularly food products in the field of food processing, are known in the art. For example, various types of food products are cut and even pretreated before being transformed by a thermal process such as frying or baking for final sale to a consumer.

It is known that various fruits and vegetables, for example potatoes, carrots, onions, squash, sweet potatoes and bananas, contain surface substances, such as starch or latex, which can detract from the flavor of the food product when it is processed for final consumption, for example in a fryer or dehydrator. The removal of latex from food products can be important because a certain percentage of consumers experience allergic reactions to it. The presence of latex can also be undesirable during the processing of a food product. For example, conveyor belts can accumulate latex while transporting freshly cut products. Cleaning latex from conveyor belts can be laborious and time consuming. The accumulation of latex on frying equipment can damage and reduce the useful life of the equipment. With respect to bananas, latex is found in all parts of the plant. When the latex is fresh and fluid it can be washed, but in a few hours it can become sticky and turn into a dark spot on the skin of the fruit, causing a decrease in the quality of the food product utilizing the fruit. The process of washing fruits and vegetables, for example plantains, with water to remove latex is known, but often requires an additional liquid specially formulated to remove fresh latex from the fruit or vegetable. For example, BANASPAR-S® is often used in the post-harvest washing process for bananas and plantains for inhibiting staining or premature ripening.

Equipment for automatically and continuously washing food products are known. For example U.S. Pat. No. 6,413,566 discloses a slicing process for relatively firm vegetables or fruit that includes feeding of the vegetables or fruit through a vertical conveyor and guiding them to a centrifugal slicing device to provide slices of the vegetables or fruit that are discharged into water. U.S. Pat. No. 4,852,441 discloses a slicing process for a food product, particularly apples, which comprises feeding the food product through a vertical conveyor and guiding it to an axial slicing disc, where said slicing disc slices the food product to obtain slices from said product. U.S. Pat. No. 5,875,697 discloses a conveyor apparatus for transporting a food product which comprises endless belt conveyors connected to each other with an adjustment mechanism which allows accommodating a variety of food products despite their size and shape. CN 107351141 discloses a cutting device for cucumbers which comprises a fastening and cutting mechanism and a feeding mechanism, an annular air bag for the fastening and cutting mechanism is installed between a zipper with a disc shape and a bearing support with a disc shape, the fastening sets are uniformly distributed on the bearing support with disc shape, some clamping pillars of the fastening sets are set in a gliding manner on the bearing support with disc shape through the bearing steps. KR 1020100116437 and U.S. Pat. No. 2,378,502 disclose a food processing device, specifically to a rotating slicer, which comprises a housing which presents an entrance and an exit, in the space within the housing a disc is set which presents a plurality of cutting sheets, which slice the food product which is pressed against them when the disc is turning.

Notwithstanding the different alternatives described above, there is a need for additional efficient, cost effective and flexible solutions for cutting products with a generally elongated shape.

BRIEF DESCRIPTION OF THE FIGURES

The drawings described herein are for illustration purposes only and are not intended to limit the scope of the present disclosure in any way.

FIG. 1.1 is a top right front perspective view of an apparatus of the invention.

FIG. 1.2 is a front view of the apparatus of FIG. 1.1 taken along the line 1.2-1.2 of FIG. 1.1.

FIG. 1.3 is a right side view of the apparatus of FIG. 1.1 taken along the line 1.3-1.3 of FIG. 1.2.

FIG. 2.1 is a top left rear perspective view of another embodiment of the apparatus of the invention.

FIG. 2.2 is a front view of the apparatus of FIG. 2.1 taken along the line 2.2-2.2 of FIG. 2.1.

FIG. 3.1 is a top right front perspective view of an embodiment of the structure of the main support of an apparatus of the invention.

FIG. 3.2 is a right side view of the structure of FIG. 3.1 taken along the line 3.2-3.2 of FIG. 3.1.

FIG. 3.3 is a front view of the structure of FIG. 3.1 taken along the line 3.3-3.3 of FIG. 3.2.

FIG. 4.1 is a top right front perspective view of an embodiment of the conveyor system of an apparatus of the invention.

FIG. 4.2 is a right side view of the conveyor system of FIG. 4.1 taken along the line 4.2-4.2 of FIG. 4.1.

FIG. 5.1 is a front view of the conveyor system of FIG. 4.1 taken along the line 5.1-5.1 of FIG. 4.2.

FIG. 5.2 is a rear view of the conveyor system of FIG. 4.1 taken along the line 5.2-5.2 of FIG. 4.2.

FIG. 6.1 is a cross-sectional view of the conveyor system of FIG. 4.1, taken along the line 6.1-6.1 of FIG. 4.2, illustrating an embodiment of a portion of the spring compressor system for the lateral belts in the upper portion of the conveyor system.

FIG. 6.2 is a cross-sectional view of the conveyor of FIG. 4.1, taken along the line 6.2-6.2 of FIG. 4.2, illustrating an embodiment of a portion of the spring compressor system for the lateral belts in the central portion of the conveyor system.

FIG. 6.3 is a cross-sectional view of the conveyor of FIG. 4.1, taken along the line 6.3-6.3 of FIG. 4.2, illustrating an embodiment of a portion of the spring compressor system for the lateral belts in the lower portion of the conveyor system.

FIG. 6.4 is an enlarged view of an embodiment of a static adjustment mechanism included in the spring compressor system, for example as shown in FIG. 6.2, for the lateral belts of the conveyor system.

FIG. 6.5 is an enlarged view of a section of the spring compressor system for the back belt of the conveyor system taken along the line 6.5-6.5 of FIG. 5.2.

FIG. 6.6 is a detailed view of a section of an embodiment of a spring compressor system of the invention installed on the exit of the conveyor system, taken along the line 6.6-6.6 of FIG. 12.2.

FIG. 6.7 is a top view of the conveyor system of FIG. 4.1, taken along the line 6.7-6.7 of FIG. 4.1, into which the products to be cut are fed.

FIG. 6.8 is a detailed view illustrating the coupling between an embodiment of the displacement means and a spring compressor system of the invention, which together can optionally be referred to as a suspension assembly.

FIG. 7.1 is a rear view of an embodiment of a driver unit of the conveyor system of the apparatus of FIG. 1.1.

FIG. 7.2 is a top right front perspective view of the driver unit of FIG. 7.1.

FIG. 8.1 is a side view of an embodiment of a driver unit of the cutting element of an apparatus of the invention.

FIG. 8.2 is a top right front perspective view of the driver unit of FIG. 8.1.

FIG. 9.1 is a detailed view of an embodiment of a bottom face of a cutting element of the apparatus of the invention.

FIG. 9.2 is a detailed view illustrating an embodiment of the coupling between the cutting element of FIG. 9.1 and the apparatus of the invention.

FIG. 9.3 is a detailed view of an embodiment of the safety module for a cutting element of the apparatus of the invention.

FIG. 10.1 is a perspective view of an embodiment of a tub of the apparatus of the invention.

FIG. 10.2 is a cross-sectional view, taken along the line 10.2-10.2 of FIG. 10.1, of the section of the tub in which a submersible pump is disposed.

FIG. 10.3 is a perspective view of the of an arrangement of the submersible pump of FIG. 10.2 in the apparatus of the invention.

FIG. 11.1 is a detailed view of an embodiment of a lower section of the apparatus of the invention and the process flow of food products exiting of the cutting element product.

FIG. 11.2 is a side view of the conveyor system of FIG. 4.1 illustrating the operation of the spring compressor system with respect to the back belt of the conveyor system.

FIG. 11.3 is a perspective view of an embodiment of the base of the apparatus of FIG. 2.1.

FIG. 12.1 is an upside-down internal perspective view of the conveyor system, from the front of the apparatus of the invention, illustrating the operation of the spring compressor system with respect to the lateral belts FIG. 12.2 is an elevational view of the conveyor system, similar to FIGS. 6.1 to 6.3, illustrating the operation of the spring compressor system with respect to the lateral belts.

FIG. 13.1 is a side schematic view, similar to FIG. 1.3, of the apparatus of FIG. 1.1 illustrating the operation of the apparatus.

FIG. 13.2 is atop view of the apparatus of FIG. 2.1 taken along the line 13.2-13.2 of FIG. 2.2.

FIG. 14.1 is a block diagram illustrating the process flow of an embodiment of the apparatus and method of the invention with a horizontal configuration and a flow towards the right.

FIG. 14.2 is a block diagram illustrating the process flow of an embodiment of the apparatus and method of the invention with a descending inclined configuration.

FIG. 14.3 is a block diagram illustrating the process flow of an embodiment of the apparatus and method of the invention with vertical ascending configuration.

DETAILED DESCRIPTION

A method and apparatus for cutting a product, for example an elongated food product having a shape and dimension, is provided. A first conveyor belt portion and a second conveyor belt portion can be provided for forming opposed first and second sides of a passageway. A third conveyor belt portion disposed adjacent to the first conveyor belt portion and the second conveyor belt portion can optionally be provided for forming a third side of the passageway. The passageway can have an entrance for receiving the elongated food product, for example delivered to it. The elongated food product can be transported through the passageway to an outlet of the passageway. The elongated food product delivered from the outlet of the passageway can be cut, for example by any suitable cutting element, to provide cut food product. The third conveyor belt portion can serve to additionally stabilizes the elongate food product being transported through the passageway. The cut food product can optionally be washed, for example by any suitable fluid, to remove undesired substances from the food product.

The first and second conveyor belt portions can each optionally extend longitudinally. The first and second conveyor belt portions can optionally extend substantially parallel to each other. The third conveyor belt portion can optionally be disposed alongside the first and second conveyor belt portions. The third conveyor belt portion can optionally extend at an acute angle or substantially perpendicular to one or both of the first and second conveyor belt portions.

At least a portion of any combination or all of the conveyor belt portions can optionally be deflectable, for example capable of being displaced, to accommodate the size and dimensions of the elongate food product being transported through the passageway. Any suitable mechanism or assembly, for example a suitable suspension assembly, displacement assembly, spring compressor assembly, spring compression assembly or any combination of the foregoing, can be utilized or provided in this regard.

The apparatus and method of the invention can optionally include a support structure or framework and a conveyor and a cutting element for cutting products carried by the support structure or framework. The apparatus and method can optionally include a driving unit, drive unit or motor to operate the conveyor and a driving unit, drive unit or motor to operate the cutting element. The conveyor can optionally include at least two lateral belts and at least one back belt to direct the products towards the cutting elements. The cutting element can optionally be arranged adjacent to an exit section of the conveyor. The apparatus and method can optionally include a tub containing fluid for receiving the cut products and cleaning them from undesired substances on their surface. The support structure or framework can optionally include a base for supporting the tub.

The apparatus and method can optionally serve to cut elongated shaped products or elongate products at a great speed. The product can be of any suitable type, for example food products. The food products can be of any suitable type, including bananas, cucumbers, zucchini, carrots, yucca, sweet potatoes, taro, malanga or any combination of the foregoing.

The apparatus and method of the invention can optionally adjust in real time and continuous form the space between the feeding belts, for example the laterals belts, the back belt or any combination of the foregoing, allowing for feeding products with shapes and dimensions that can vary from one product to another, sometimes with a high frequency.

The accompanying figures are illustrative of an embodiment for cutting bananas; however it is appreciated that the apparatus and method of the invention may be used with any product, for example any food or other product having an elongated shape such as any of the food products disclosed above. In addition, the accompanying figures illustrate an embodiment of the apparatus and method of the invention which presents a vertical configuration with descending flow, that is the feeding of the products to be cut is undertaken by the upper part of the apparatus, while the exit and the tub in which the product is washed are set on the lower part. It is appreciated that the configuration can be modified, for example without affecting the essence of instant invention, to provide other desired configurations such as: vertical with ascending flow, for example fed through the lower part and the exiting and washing is accomplished through the upper part; horizontal with flow towards the right or the left, for example feeding and the exit are in the same line; inclined with descending flow, for example fed through the upper part and the exit and washing is accomplished in the lower part; inclined with ascending flow, for example fed through the lower part and the exit and washing is accomplished through the upper part, among others. Some of these embodiments are shown by means of block diagrams in FIGS. 14.1 through 14.3.

The term "a plurality" as used herein can optionally refer to any plurality, including a number ranging from 2 to 20. The term "at least" as used can optionally refer to a minimum value or lower limit for the element to which it refers.

Apparatus 10 of the invention optionally comprises a support structure 11, a conveyor 13, a driving unit 14 to activate and operate the conveyor 13, a cutting element 20 and a driving unit 28 to activate and operate the cutting element 20 (see FIGS. 1.1 through 1.3). The support structure 11 can optionally be referred to as a main support structure, a framework or any combination of the foregoing. The conveyor can optionally be referred to as a conveyor system or assembly. Each driving unit can optionally be referred to as a drive unit.

The main support structure 11 can optionally include a plurality of indents or deformations 12 to couple the conveyor 13 and the cutting element 20 with their respective drive units 14 and 28, as illustrated in FIGS. 1.1 through 1.3. The main support structure 11 can be provided with additional attachments for coupling more elements to the apparatus of the invention, for example an attachment for coupling a conveyor (not shown) for feeding the product 9 to be cut in an automated and continuous manner.

The conveyor 13, further illustrated in FIGS. 4.1, 4.2, 5.1, 5.2, 6.1 through 6.7, 11.2, 12.1 and 12.2, can optionally include a first plate 34 and a second plate 35 or other suitable support elements. Plates 34, 35 can optionally extend parallel to each other. The plates are optionally provided with a plurality of orifices or holes for coupling the plates together in any suitable manner, for example, a plurality of mechanical couplings 36 or other fasteners that can include screws and nuts. A plurality of optional separators, which can optionally be coupled between the first and second plates 34 and 35 in any suitable manner for example by means of the mechanical couplings, can determine the distance between the first and second plates 34 and 35. The plurality of separators can optionally be a plurality of sleeves, but it is appreciated that a wide variety of elements could be used for these purposes. In another embodiment, the first and second plates 34 and 35 are arranged and welded to a plurality of suitable separators.

The feeding of the product 9 into apparatus 10 is optionally undertaken by means of a feeding section or entrance 37, which in the illustrated embodiment is optionally set in the upper part of the conveyor system 13. The exit of the conveyor system, which feeds to the cutting step, is carried out by an exit section or outlet 38, which in the illustrated embodiment is set in the lower part of the conveyor system 13. The exit section 38, regarding the configuration or orientation of the conveyor of the apparatus of the invention, is optionally arranged, disposed or positioned adjacent to the cutting element 20. The feeding section 37 is optionally configured in a hopper shape. Such hopper shape is illustrated as being provided on the first plate 34 (see FIGS. 4.1, 4.2 and 5.2), but it is appreciated that such hopper shape can be provided in the first plate 34, the second plate 35 or both.

First displacement means 71 are optionally provided to displace, deflect or position at least a portion of the laterals belts 41 of the conveyor system (see FIGS. 6.7 and 6.8). The lateral belts optionally include a first lateral belt 41 and a second lateral belt 41, which each have portions 41*a* that are optionally spaced apart and in opposition to each other (see FIGS. 6.1 to 6.3, and 12.2). Belt portions 41*a* can optionally be referred to as extending longitudinally, for example linearly. The opposed belt portions 41*a* can optionally extend parallel to each other. Belt portions 41*a* can optionally be referred to as front or operable portions of the belts 41 or a conveyor belt portion, with the remainder of each belt 41 optionally referred to as the rear portion of the belt. Each of the belts 41 is optionally an endless loop. The opposed portions of the first and second lateral belts, for example belt portions 41*a*, provide a passageway 91, which can optionally be referred to as a feed passageway, for carrying food products from the feeding section or entrance 37 to the exit section or outlet 38 of the conveyor system 13 (see FIG. 12.2). Belt portions 41*a* form opposed longitudinal surfaces or walls of the passageway 91. The first displacement means 71 can optionally displace, deflect or position at least a portion of the laterals belts portions 41*a*. The first displacement means 71, one for each lateral belt 41, are positioned through the front or internal part of the first plate 34 and the back or internal part of the second plate 35 in such a way so as to be set in the internal part of the conveyor system 13 (FIGS. 4.1, 4.2, 12.1 and 12.2). Each of the first displacement means 71 optionally includes at least one driving pin 39, at least one feeding pin 40, at least one compressor pin 26, at least one tensing pins 44, at least one free pins 45 and at least one exit pin 46, each of which is rotatable for permitting travel of the respective lateral belt 41 relative to the pin (FIG. 12.2). Each first displacement means can optionally be referred to as a belt displacement means, a belt displacement guide, belt guide pins or any combination of the foregoing. The coupling of each of the first displacement means 71 to the plates 34 and 35 of the conveyor system 13 is undertaken by any suitable coupling means, for example suitable mechanical fasteners such as screws and nuts. The first displacement means 71 present shafts 27, for example the pins 39, 40, 26, 44, 45 and 46 discussed above or any combination thereof, which will be coupled to the spring compressor system 49 (FIGS. 6.6 and 6.7), as will be described later.

The first plate 34 of the conveyor 13 has a central part (FIG. 5.2) provided with a longitudinal opening in which portion 42a of a back belt 42 is disposed. The longitudinal opening in the first plate optionally has a rectangular shape. At least a portion of the back belt 42 is spaced outwardly from the back or outer part of the first plate 34 of the conveyor system 13 (see FIG. 4.2). Belt 42 is optionally an endless loop. Belt portion 42a provides a longitudinal surface or wall of passageway 91 and optionally extends substantially perpendicular to each of the opposed lateral belt portions 41a of the passageway 91. Belt portion 42a can optionally be referred to as front or operable portions of the belt 42 or conveyor belt portion, with the remainder of the belt 42 optionally referred to as the rear portion of the belt. Belt portion 42a can optionally be referred to as extending longitudinally, for example linearly. Back belt portion 42a can optionally extend at an acute angle to each of the lateral belt portions 41a. Back belt portion 42a can optionally extend substantially perpendicular to one or both of the lateral belt portions 41a.

Second displacement means 58 are optionally provided to displace, deflect or position at least a portion of the back belt 42 of the conveyor system. The second displacement means 58 can optionally displace, deflect or position at least a portion of the back belt portion 42a. The second displacement means can optionally be placed in or on the back or outer part of the first plate 34 (see FIGS. 5.2, 6.5 and 11.2). The second displacement means 58 optionally includes at least two back upper pins and two back lower pins, for example pins or shafts 27, which are coupled to the spring compressor system 49. Each of the back upper pins and back lower pins of the second displacement means 58 is rotatable for permitting travel of the back belt 42 relative to the pin. The second displacement means can optionally be referred to as a belt displacement means, a belt displacement guide, belt guide pins or any combination of the foregoing.

As discussed above, the lateral belts 41 and the back belt 42 form a passageway or path 91 so that the product 9 to be cut by apparatus 10 can be fed. The passageway or path, and belts 41 and 42, are optionally configured such that product 9 optionally maintains a single position and direction, without risking falling, while traveling through the passageway or path 91, for example under the force or direction of at least one of the belts 41, 42 (see FIG. 6.6).

The product 9 can optionally travel through passageway or path 91 under the force or direction of one or both lateral belts 41, under the force of gravity or any combination of the foregoing. Each driving pin 39 serves to transfer the drive force to the respective belt. Each feeding pin 40 serves to maintain the proper motive force of the belt 41 operating on product 9 entering passageway or path 91 at the entrance 37 of the conveyor system 13. The one or more tensing pins 44 serve to maintain the desired tension in the belt 41 during operation of the conveyor system. The one or more compressor pins 26 serve to provide the desired compressive force by the belt 41 on product 9 traveling through the passageway or path 91. The exit pin 46 serves to maintain the proper motive force of the belt 41 operating on product 9 exiting passageway or path 91 at outlet 38 of the conveyor system 13.

A plurality of guides 43 engage the lateral belts 41, under force provided by respective compressor pins 26, to help the belts displace the product 9 through passageway 91 to the cutting step and maintain the product 9 in a desired position within the passageway, for example extending longitudinally through the passageway. Each of the plurality of guides 43 can be selectively displaced by the respective compressor pin 26, for example as a function of the size, shape or both of the product 9 being cut by apparatus 10. In the embodiment illustrated in FIGS. 6.1, 6.3 and 12.2, the displacement of the guides 43 is horizontally, for example from left to right or vice versa.

The second plate 35 can optionally comprise a longitudinal opening which coincides with the longitudinal opening of the first plate 34 of the conveyor 13, over which a window 48 can be placed to cover the longitudinal opening and allow the internal components of the conveyor system 13 of the apparatus 10 to be visible (see FIGS. 1.2, 4.1 and 5.1). The window 48 can be fixed or secured to the second plate by any suitable coupling means, for example suitable mechanical fasteners such as screws and nuts. The window 48 can optionally have a rectangular shape.

Apparatus can optionally be provided with any suitable spring compressor system for controlling the displacement of the first displacement means 71, the second displacement means 58 or both. The spring compressor system 49 embodiment can optionally comprise a plurality of displacement chambers 92, for example elongated displacement chambers. Each displacement chamber can optionally be arranged in a base structure 51 (see FIGS. 4.1 to 6.5). In a displacement chamber or chamber of any of the plurality of displacement chambers 92, an optional bushing 55 can be provided through which a pin or shaft 27 of the respective displacement means extends. The bushing 55 is optionally slidably disposed in the displacement chamber 92. An optional spring 54 can be provided in the displacement chamber 92 for applying a compression force to bushing 55 and thus the shafts or pins 27, for example of the first displacement means 71 with respect to the side belts 41 which are coupled to an end of the bushing 55 by means of the pins or shafts 27. The spring 54 can optionally be coupled on the opposite end to any suitable calibration element 56 to decrease or increase the force applied to the bushing 55 by the calibration element 56. The calibration elements 56 can optionally comprise at least one calibration screw or threaded member or element. When the spring 54 applies tension to the bushing 55 by means of the calibration elements 56, the shafts 27 of the respective displacement means 71 are displaced longitudinally within the displacement chamber 92 in relation to the base structure 51 to move or displace the lateral belts 41, for example as shown by the arrows in FIGS. 6.1 through 6.3. A spring compressor system having a spring 54 can optionally be referred to as a dynamic adjustment system, assembly or mechanism.

The spring compressor system 49 can optionally include a static adjustment system, assembly or mechanism, for example as shown with respect to the spring compressor system coupled to tensing pins 44 (see FIGS. 6.2, 6.4 and 12.2). The static adjustment system can include a base structure 51 having a displacement chamber 92. A bushing 55, through which the respective shaft 27 of tensing pin 44 extends, is slidable disposed in the displacement chamber 92. A calibration element 56 is carried by the base structure for engaging the bushing so as to selectively move the bushing within the displacement chamber. The static adjustment system does not include a spring, and thus bushing 55 is not dynamically disposed in the displacement chamber but instead disposed in a static position determined by the calibration element 56. The bushing provides a constant pressure to the shaft, for example the tensing pin 44, for example equal to the counter pressure of the lateral belt 41 on the tensing pin, in such a way that the lateral belts 41 maintained tense throughout the operation of apparatus 10. The static adjustment system of the spring compressor system 49 can optionally be installed for both lateral belts 41 and on each one of the plates 34 and 35 of the conveyor 13.

A spring compressor system 49 can optionally be installed at the exit or outlet 38 of the conveyor system 13, for example coupled to exit pins 46. Such spring compressor system can optionally include a base structure 68 coupled to both exit pins 46 (see FIGS. 6.3 and 12.2). Coupling means 57 can optionally be provided to join a spring 83 with the base structure 68, for example as shown in FIG. 6.6. The coupling means 57 may optionally include screws or any other suitable element or fastener for these purposes. The spring 83 and the coupling means 57 can optionally be installed in a lower chamber 50 of the base structure 68, for example as shown in FIGS. 6.3, 6.6 and 12.2.

The spring compressor system 49 of the invention allows for continuously opening and closing the space, for example of passageway or path 92, between the opposed lateral belts 41 along any portion of the length of the belts 41. Such opening and closing, which can optionally be referred to as the positioning, displacement or spacing of the lateral belts, can optionally be a function of the dimensions, shape or both of the product 9 passing through the passageway. The spring compressor system 49 of the invention optionally allows for the deflection or movement of a portion of the belt portions 41a, for example as a function of the size, shape, dimensions or any combination of the foregoing of the product 9 passing through passageway 91. Such functioning of the spring compressor system 49 and belts, can optionally maintain the product 9 in an optimal position for the cutting step of apparatus 10. Such functioning can optionally decrease the amount of residues generated during the cutting step.

The spring compressor system 49 can optionally be installed on the plates 34 and 35 of the conveyor system 13 by any suitable means, for example screws or other suitable fasteners. The spring compressor system 49 can optionally comprise a lid (not shown) to be able to maintain all of the elements or components of the system in proper position.

The spring compressor system 49 can optionally be utilized with the back belt 42, for example to adjust the position of back belt portion 42a relative to the lateral belts 41. In order to tense the back belt 42, base structures 51, springs 54, bushings 55 and calibration elements 56 can optionally be placed on the back or outer part of each end of the first plate 34 of the conveyor system 13, for example as shown in FIGS. 6.5 and 11.2 with respect to second displacement means 58. The pins or shafts 27 of the second displacement means 58 are optionally coupled to the bushing 55. Optionally, a guide 81 can be provided to engage portion 42a of the back belt 42 so as to inhibit undesirable deformation of the back belt portion 42a (see FIG. 11.2). The spring compressor system 49 with respect to back belt 42 and the second displacement means 58 can, together, optionally be referred to as a spring suspension assembly or third spring suspension assembly.

First lateral belt 41 can optionally be referred to as being part of a first conveyor assembly. Second lateral belt 41, opposed to the first lateral belt, can optionally be referred to as being part of a second conveyor assembly. Back belt 42 can optionally be referred to as being part of a third conveyor assembly. Each displacement means 71, 58 and spring compressor system 49 having a spring 54, or dynamic spring compressor system, can together optionally be referred to as a suspension assembly (see FIG. 6.8). A displacement means 7, 58 and respective spring compressor system 49 without a spring, or static adjustment system, can optionally be referred to as a tensioning assembly.

Driving unit 14 (FIGS. 7.1 and 7.2) optionally comprises motor means 15, a transmission system 79 that optionally comprises a pulley 76 connected to the motor means 15, a pulley 77 connected to a gear arrangement 78, and a strap or belt 18 coupled to both pulleys 76 and 77. The gear arrangement 78 optionally comprises at least two motor gears 16 for transmitting rotary energy from the motor means to the lateral belts 41 and at least two free gears 17 for changing the direction of movement of the lateral belts 41 of the conveyor 13 and transmitting the necessary power to the motor gears 16. A support structure 19 of any suitable type can optionally be provided for coupling all the previous elements to the main support structure 11. The at least two motor gears 16 are optionally connected to the at least two driving pins 39 by means of respective shafts 73 (see FIGS. 4.1, 4.2 and 12.1). The motor means 15 can optionally be a motor. The motor means 15 can be selectively directed to move the lateral belts 41 at the same velocity and torque but in opposite direction from each other.

In the vertical descendent embodiment of apparatus 10 illustrated in FIGS. 1.1 through 13.2, product 9 is displaced or travels downwardly through passageway 91 under the force of gravity towards the cutting element 20. The travel of product through passageway 91, for example when such travel is ascending vertically or horizontal with flow towards the right or the left, the travel can be facilitated or undertaken by the action or movement of the lateral belts 41. The conveyor system 13 can optionally be provided in the exit section 38 with adequate or suitable means (not shown), for example deflectors, to direct the product 9 to be cut towards the cutting element 20.

The lateral belts 41 can optionally be activated, for example by driving unit 14, during the operation of apparatus 10. Back belt 42 can optionally move in a free manner, without any type of motor, as the product 9 is being fed or travels through passageway 91. The free movement of belt 42 contributes to the product remaining in a fixed travel position within the passageway, and avoiding product overlaps while product is moving towards the cutting element 20.

In the illustrated embodiment of apparatus 10, the cutting element 20 is optionally disposed in a horizontal manner and adjacent to the exit section 38 of the conveyor system 13 (see FIGS. 9.1 through 9.3). The cutting element 20 is optionally a disc, for example like the one sold by the manufacturer URSCHEL®. The cutting element 20 comprises a body 21 with a bottom face, shown in FIG. 9.1, and a top face optionally in direct contact with the conveyor system 13 (see FIGS. 9.2 and 9.3). The cutting element 20 has a spindle 22, extending along rotation axis, for coupling the cutting element 20 with the main support structure 11.

The cutting element 20 is optionally supported by at least two support elements 72, for example, rowlocks, which help in the calibration and alignment of the cutting element 20. The support elements 72 can optionally be placed on the top face of the cutting element 20 surrounding the spindle 22, such as can be seen in FIG. 9.2. On the spindle 22, upper 23 and lower 24 calibration elements of any suitable type, for example screws, are set for adjusting, for example increasing or decreasing, the distance between the cutting element 20 and the lateral belts 41.

The cutting element 20 may optionally comprise any suitable safety module for avoiding vibrations which could be generated when the cutting element 20 is operating at high speeds (see FIG. 9.3). The safety module may optionally comprise a box 52 in whose interior a rotary element 53 is disposed, for example a bearing and a fixing element 25 of any suitable type, for example a screw, for fixing the rotary element 53 to the box 52. The box 52 is optionally joined to the equipment by coupling means 82, which allow adjusting the height of the safety module.

The functioning of the safety module optionally consists in a buffering mechanism which applies a normal force on the top face of the cutting element 20, for example by means of the rotary element 53, in such a way that the vibrations form the cutting element 20 are absorbed by the rotary element 23. Damage to both the cutting element 20 as well as to the conveyor belt of system 13 are thus minimized or avoided.

A driving unit 28 activates and operates the cutting element 20 (see FIGS. 8.1 and 8.2). The unit 28 optionally comprises a motor means 29, for example an electric or other motor; a transmission system 80 that optionally comprises a pulley 30 connected to the motor means 29, a pulley 32 that is connected to the cutting element 20 and a strap 31 to couple the pulleys 30 and 32 together. It is appreciated that other types of transmission systems can be used, for example friction wheels or chains. A support structure 33 of any suitable type is provided for supporting all of the above elements. The motor means 29 transmits the necessary power to the cutting element 20 so that it may turn and cut product 9 fed to the cutting element by conveyor system 13. The turn or rotation velocity of the cutting element 20 can optionally reach is 2100 rpm, such that the cutting process is nearly instantaneous. Such velocity can be modified according to the needs of each process.

The velocity of the cutting element 20 and the velocity of the lateral belts 41 of the conveyor system 13 are optionally controlled by two different driving units with variable frequency, permitting modulation of the production capacity of the apparatus of the invention. The apparatus of the invention is thus adequate for different purposes and different sectors, for example for small, medium and large producers.

The support structure 33 of the driving unit 28 may optionally comprise a base plate 74 on which the motor means 29 are placed, mounted or carried. The base plate 74 is optionally provided with a plurality of elongated grooves 75 onto which a plurality of coupling means are coupled, by any suitable manner such as mechanical fasteners of any suitable type such as screws and nuts, for coupling the base plate 74 to the support structure 33 (see FIG. 8.2). The base plate 74 is optionally displaceable or movable longitudinally relative to the support structure 33, which allows for adjusting the tension in the strap 31 to avoid displacement problems.

A wash of any suitable type can optionally be provided for washing, for example receiving and washing, the cut food product, for example from cutting element 20. In this regard, for example, an optional tub 59 can be provided adjacent manner to the exit of apparatus 10 (see FIGS. 2.1, 2.2, 10.1 and 10.2). The tub 59 can contain fresh water, oil or any other type of adequate fluid for receiving the cut products from apparatus 10, depending on the desired purpose and the type of product fed. Cutting element 20 can optionally be set within the tub 59 containing some fluid for facilitating the cutting process and depositing the product 9 directly into the fluid. The cutting element 20 is optionally not completely submersed in the fluid, but rather only a portion of the cutting element 20 and the lower calibration element 24 are optionally in direct contact with the fluid, such as is shown in FIG. 11.1.

When the process of the invention pertains to food products, the tub 59 optionally contains fresh water in order to wash the food products at the same time they are being cut as the food products may have undesired substances such as starch or latex or their surface. The tub 59 can optionally contain oil at room temperature, which can advantageously be used in instances when the cut product is later cooked, for example within a fryer. For example, the product can be directly introduced into a fryer after the cutting step. When cutting of the product occurs in water, a step prior to the frying in which all the water is evaporated may be needed so that water does not enter the fryer and cause damage. Utilization of either water or oil for removing undesired substances from the product 9 additionally minimizes the undesirable overlapping of sliced product emerging from the cutting element 20.

Tub 59 optionally has an inverted pyramid shaped, such as is shown in FIG. 10.1. At an end of the tub 59, an optional extended section 60 is provided to accommodate a conveyor belt 65 for conveying the cut product from the apparatus 10. It is appreciated that the shape of the tub 59 can be altered according to the needs of the process. The illustrated shape of the tub 59 allows that both the fluid in the tub and the undesirable material emanating from the cut product flow to the same area, for example towards a section 61 of the tub 59 where any suitable means of extraction 62 such as a submersible pump is provided to transport the fluid containing cut product residues through a hose 69 towards the next step of the process (see FIG. 10.2).

An optional deflector (not shown) can be placed at the end of the conveyor belt 65 to guide the cut product towards another step of the process, for example to the cooking of the product prior to its sale to the end consumer (see FIG. 11.1). Similarly, air flow can optionally be supplied at the exit of the conveyor belt 65 to push slices of cut product towards another step of the process. At the exit of the conveyor belt 65 for cut product a dispenser element 67 of clean fluid, for example a sprinkler, can optionally be provided for further cleaning of the cut product.

Tub 59 can optionally include a valve 64 to control the fluid level within the tub and avoid spillages. The tube can optionally include a purge 63 for draining the fluid within the tub 59 (FIG. 10.1). On the other end of the tub 59, an optional filtering element of any suitable type, or example a filtering belt 66 with a mesh, is provided. Optional submersible pump 62 in section 61 of the tub 59 delivers fluid in the tub to the filtering element 66 for filtering the fluid before the fluid is recirculated to the cutting element 20 (see FIGS. 2.2 and 13.2).

A base 70 supports the apparatus 10, including with all the structural or optional features discussed above, for example as shown in FIGS. 2.1 and 2.2.

Suitable methods for cutting products, for example food products, are provided. Such methods includes methods utilizing the apparatus of the invention, for example apparatus 10. A method of the invention can include the step of feeding the product 9 to be cut to the conveyor system 13 of the apparatus 10 through the feeding section 37. When the product is a food product, the food product can optionally be supplied without a peel and without the ends or edges to ease the process. The product 9 is optionally positioned in the feeding section 37 of the conveyor 13 with the longest side parallel to the conveyor belts of system 13, for example as is shown in FIG. 13.1.

The method of the invention can include the step of transporting the fed product 9 to the cutting element 20, for example by means of the conveyor system 13.

The method of the invention can include the step of expanding, reducing or both the distance between the lateral belts 41, and optionally the distance of the back belt 42 relative to the lateral belts, of the conveyor system 13, for example as a function of the shape, dimensions or both of the fed product 9. The spring compressor system 49 can optionally be utilized in this regard.

The method of the invention can include the step of cutting the product 9, for example with the cutting element 20.

The method of invention can optionally include removal of undesired substances from the cut products. Removing undesired substances from the cut product can optionally be accomplished by immersing the cut product in an adequate fluid, for example contained in tub 59, to obtain a cleaned cut product. The cleaning fluid, for example in tube 59, gradually changes its coloring, appearance or both due to the undesired substances being transferred from the cut product to the fluid. Latex, for example, causes water to turn yellow and causes oil to turn cloudy. To maintain a clean fluid, the fluid must be periodically, constantly or continuously replaced, as a function of the type of process and as determined by a person skilled in the art. Oil, for example, can be filtered to remove the residues from the undesired substances and can then be reused in the process of the invention.

The method of the invention can include the step of removing the cut product from the process. For example, following the removal of the undesired substances in the tub 59 containing a fluid, the product arrives at a conveyor belt 65 for cut product due to the eccentric force with which it is expelled from the cutting element 20 (see FIG. 11.1). In addition to transporting the cut product outside or from the apparatus 10 towards other possible steps of the process (for example, frying), the conveyor belt 65 can optionally serve as a filter for separating the clean product slices from the undesired substances removed from the product and now contained in the fluid. A clean fluid flow can optionally be supplied through a dispensing element 67 provided at the exit of the conveyor belt 65, carrying cut product, for further cleaning the cut product (see FIG. 11.1). Thereafter, the clean and cut products can be supplied to later steps, optionally with the help of the deflector (not shown) and the air flow which flows from the exit of the conveyor belt 65 (see FIG. 11.1).

The method of the invention can optionally include a filtering and re-circulation step of the filtered fluid to the cutting element 20 for use. For example, the fluid loaded with the undesired substances can be filtered and delivered to the cutting element 20 for reuse. The used fluid with the cut product carried by the conveyor belt 65, which fluid contains the undesired substances transferred from the cut product, can be optionally directed towards a submersible pump 62. The pump can direct the used fluid through a hose 69 towards a filtering belt 66, where it can be filtered to remove the undesired substances. The filtered fluid can be supplied back to the cutting element 20 for reuse in a subsequent cleaning step. Such filtering and cleaning of the fluid facilitates the knives of the cutting element 20 remaining clean and lubricated.

The optional removal of undesired substances from the cleaning fluid in the method and apparatus of the invention occurs in an almost instantaneous or continuous manner, for example seconds after the undesired substances are introduced into the tub 59 containing the fluid. The method and apparatus of the invention provide an efficient cutting and removal of undesired substances system. The removal of undesired substances from the cut products contributes to the finished product not sticking to the walls of the equipment, for example food processing equipment, or to the hands of the personnel who handle the finished product. The method and apparatus of the invention for removing undesired substances from food products avoids the use of chemical additives often used remove said substances. The finished product has an excellent appearance for final consumption.

An apparatus for cutting products is provided and can include a main support structure, a conveyor set on the main support structure, the conveyor comprising a feeding section, an exit section, a first plate, a second plate, first displacement means which displace at least two lateral belts and second displacement means which displace at least one back belt, said first displacement means being set between said first plate and second plate and said second displacement means being set in a back/outer section of the first plate of the conveyor, a spring compressor system set on the main support structure for regulating the tension of the at least two lateral belts and the at least one back belt, and a cutting element set on the main support structure for cutting the products which are fed, and in an adjacent manner to the exit section of the conveyor.

The apparatus can optionally include a driving unit to activate the conveyor, a driving unit to activate the cutting element and coupling means to couple the first and the second plates of the conveyor between themselves. The first displacement means can optionally include at least two driving pins, at least two feeding pins, at least two compressor pins, at least two tensing pins, at least two free pins and at least two exit pins, and the second displacement means can optionally include at least two upper back pins and at least two lower back pins. The first displacement means and the second displacement means can optionally include shafts which are coupled to the spring compressor system. The apparatus can optionally include a plurality of guides which help the lateral belts to be able to displace the product to the cutting step and maintain it in a set position, the plurality of guides can optionally be displaced, depending on the dimensions of the product to be cut. The spring compressor system can optionally include a plurality of displacement chambers set in a base structure that optionally have a bushing coupled to the first displacement means and a spring coupled to the inside of the bushing for applying tension to the shafts of the first displacement means and the second displacement means, wherein the spring compressor system acts both on the lateral belts and on the back belt. The spring compressor system can optionally include calibration elements to decrease or increase the tension applied to the shafts of the first displacement means The calibration elements can optionally include at least one calibration screw. The spring compressor system can optionally include a static adjustment system for maintaining the lateral belts tense at all times. The spring compressor system can optionally include a section installed at the exit of the conveyor that optionally includes a base structure connected to the exit pins, wherein the base structure optionally includes a lower chamber on which a spring is set for opening and closing the space between the lateral belts and coupling means to join the spring to the base structure. The driving unit which activates the conveyor can optionally include a motor means, a gear arrangement, a transmission system and a support structure for coupling all the above elements to the main support structure. The gear arrangement of the driving unit can optionally include at least two motor gears and at least two free gears, wherein the transmission system can optionally include a pulley which is connected to the motor means, a pulley which is connected to the gear arrangement and a strap to couple the pulleys. The cutting element can optionally include a body and an axis which couples the cutting element with the main support structure. The cutting element can optionally include at least two support elements which help in the calibration and alignment of the cutting element, upper calibration elements and lower calibration elements. The support elements can optionally include at least two rowlocks, the lower calibration elements can optionally include at least one lower calibration screw and the cutting element can optionally be a disc. The driving unit to activate the cutting element can optionally include a motor means, a transmission system and a support structure that optionally includes a base plate on which the motor means is placed and which presents a plurality of elongated grooves to be coupled to the support structure such that the base plate is displaceable longitudinally. The transmission system can optionally include a pulley which is connected to the motor, a pulley which is connected to the cutting element by means of the axis and a strap to couple the pulleys. The cutting element can optionally include a safety module optionally having a box in whose interior a rotary element is set and a fixing element for fixing the rotary element to the box. The rotary element can optionally be a bearing and the fixing element can optionally be a screw.

An apparatus for cutting products is provided and can include a main support structure unto which are set, a conveyor with a first plate, a second plate, first displacement means which displace two lateral belts and second displacement means which displace at least one back belt, said first displacement means set between said first and second plates and said second displacement means being set in a back/outer section of the first plate of the conveyor, wherein the conveyor comprises a feeding section and an exit section, a spring compressor system for regulating the tension of the at least two lateral belts and the at least one back belt, a cutting element for cutting the products which are fed, set in an adjacent manner to the exit section of the conveyor, a tub containing some fluid for receiving the cut products that can optionally include a section which is extended from one end of the tub in order to set a conveyor belt for cut product which will convey the cut product outside of the apparatus, a section for placing means for extraction, and a base for supporting all of the above elements.

The conveyor belt for cut product can optionally include a dispenser element for spraying clean fluid to the cut product, wherein the tub is optionally set with a hose to transport the fluid containing cut product residues, a valve to control the fluid level, and a purge for draining the fluid within the tub. The apparatus can optionally include a filtering belt which can optionally include a mesh for filtering the fluid loaded with residues emanating from the means of extraction and wherein the means of extraction optionally includes a submersible pump.

A method for cutting products is provided and can include the steps of providing a product to be cut, transporting the product by means of a conveyor that can optionally include at least two belts and at least one back belt towards a cutting element, wherein the direction of transport can be horizontal with flow towards the right or the left, vertical with descending or ascending flow or inclined with descending or ascending flow, expanding/reducing the distance between the belts and of the conveyor to adjust the flow path, depending on the dimensions of the fed product, cutting the product by passing it through the cutting element in a direction that can be horizontal with flow towards the right or the left, vertical with descending or ascending flow or inclined with descending or ascending flow.

The method can optionally include the steps of removing undesired substances from the cut product by means of transferring said substances to a fluid contained in a tub and removing the cut product free of undesired substances by means of a conveyor belt for cut product to obtain clean and cut product. The method can optionally include the step of supplying clean fluid to the clean and cut product obtained from the conveyor belt for cut product for further cleaning it from undesired substances, wherein the fluid is optionally supplied by means of a dispensing element. The method can optionally include the step of filtering the fluid loaded with the undesired substances from the product on a filtering belt and feeding said filtered fluid back to the cutting element. The substances removed from the cut product are optionally latex and starch and the fluid contained in the tub is optionally selected from water and oil. The products optionally include fruits and vegetables, bananas, cucumbers, zucchini, carrots, yucca, sweet potato, taro, malanga or any combination of the foregoing.

The apparatus and method of the invention can optionally adjust in real time and continuous form the space between the feeding belts, for example the laterals belts, the back belt or any combination of the foregoing, allowing for feeding products with shapes and dimensions that can vary from one product to another, sometimes with a high frequency. The apparatus and method of the invention, optionally including such adjustment feature, provides for lower production times and costs.

The apparatus and method of the invention advantageously allows for modulating the production capacity, which can be useful for small as well as medium and large producers. The apparatus and method of the invention are simple, efficient, cost effective and allow for efficient removal of undesired substances on the surface of the cut products, such as latex or starch, thus minimizing or avoiding the use of special chemical products for the removal of said substances. The apparatus and method of the invention facilitates the manipulation and processing of the cut products and optionally delivers clean cut products, for example free of undesired substances. Such clean cut products optionally do not adhere to the walls of the equipment or stick to the hands of the personnel handling them. Such provided clean cut product have an excellent appearance for their end consumption.

It is appreciated that alterations of the description and illustration of the invention, including various combinations of the features disclosed herein, are possible and permissible. The illustrations herein are merely for illustrative purposes, and amendments and changes thereto are within the scope of the invention. For example, changes to the shape, material and dimensions of the features disclosed herein are permissible and contemplated by the invention.

We claim:

1. An apparatus for cutting an elongated food product having a shape and dimensions, comprising a first conveyor assembly, a second conveyor assembly, a food cutting element, the first conveyor assembly having a first conveyor belt portion and the second conveyor assembly having a second conveyor belt portion opposing the first conveyor belt portion for forming opposite first and second sides of a passageway for receiving the elongated food product and delivering the elongated food product to the cutting element for providing cut food product, a third conveyor assembly disposed alongside the first conveyor assembly and the second conveyor assembly, the third conveyor assembly having a third conveyor belt portion for forming a third side of the passageway for stabilizing the elongated food product while traveling through the passageway.

2. The apparatus of claim 1, wherein the first conveyor belt portion and the second conveyor belt portion extend parallel to each other.

3. The apparatus of claim 1, wherein the third conveyor belt portion extends substantially perpendicular to each of the first conveyor belt portion and the second conveyor belt portion.

4. The apparatus of claim 1, further comprising a support structure, a first spring suspension assembly for coupling the first conveyor belt portion to the support structure, a second spring suspension assembly for coupling the second conveyor belt portion to the support structure and a third spring suspension assembly for coupling the third conveyor belt portion to the support structure, each of the suspension assemblies permitting displacement of at least a portion of the respective conveyor belt portion as a function of the shape and dimensions of the elongated food product traveling through the passageway.

5. The apparatus of claim 4, wherein each of the first spring suspension assembly and the second spring suspension assembly has a spring for exerting a force on the respective conveyor belt portion and a calibration element for adjusting the force of the spring on the respective conveyor belt portion.

6. The apparatus of claim 5, wherein the third spring suspension assembly has a spring for exerting a force of the third conveyor belt portion and a calibration element for adjusting the force of the spring on the third conveyor belt portion.

7. The apparatus of claim 1, further comprising at least one driving unit for moving the first conveyor belt portion and the second conveyor belt portion.

8. The apparatus of claim 7, wherein the at least one driving unit is configured to move the first conveyor belt portion and the second conveyor belt portion in opposite directions.

9. The apparatus of claim 1, further comprising a first tensioning assembly for selectively adjusting the tension of the first conveyor belt portion and a second tensioning assembly for selectively adjusting the tension of the second conveyor belt portion.

10. The apparatus of claim 1, further comprising a wash for receiving and washing the cut food product to deliver a cleaned cut food product.

11. A method for cutting an elongated food product having a shape and dimensions, comprising providing a first conveyor belt portion and a second conveyor belt portion for forming opposed first and second sides of a passageway, providing a third conveyor belt portion disposed adjacent the first conveyor belt portion and the second conveyor belt portion for forming a third side of the passageway, delivering the elongated food product to an entrance of the passageway, transporting the elongated food product through the passageway to an outlet of the passageway, and cutting the elongated food product received from the outlet of the passageway to provide cut food product whereby the third conveyor belt portion additionally stabilizes the elongated food product being transported through the passageway.

12. The method of claim 11, further comprising removing undesired substances from the cut food product with a fluid.

13. The method of claim 12, wherein the fluid is selected from the group consisting of oil and water.

14. The method of claim 13, further comprising filtering and recirculating the fluid for use in removing undesired substances from additional cut product.

15. The method of claim 11, further comprising deflecting at least a portion of the first conveyor belt portion and the second conveyor belt portion as a function of the shape and dimensions of the elongated food product.

16. The method of claim 15, further comprising deflecting at least a portion of the third conveyor belt portion as a function of the shape and dimensions of the elongated food product.

17. The method of claim 11, further comprising the step of selecting the elongated food product from the group consisting of fruits, vegetables, bananas, cucumbers, zucchini, carrots, yucca, sweet potato, taro, malanga and any combination of the foregoing.

* * * * *